United States Patent
McCartney

(10) Patent No.: US 11,828,036 B2
(45) Date of Patent: *Nov. 28, 2023

(54) GUARD FOR COMPACTOR VEHICLE AND ASSOCIATED METHOD

(71) Applicant: Bernard McCartney Limited, Stockport (GB)

(72) Inventor: Neil McCartney, Stockport (GB)

(73) Assignee: BERNARD MCCARTNEY LIMITED, Stockport (GB)

(*) Notice: Subject to any disclaimer, the term of this patent is extended or adjusted under 35 U.S.C. 154(b) by 2 days.

This patent is subject to a terminal disclaimer.

(21) Appl. No.: 17/678,921

(22) Filed: Feb. 23, 2022

(65) Prior Publication Data

US 2022/0349141 A1 Nov. 3, 2022

Related U.S. Application Data

(63) Continuation of application No. 17/243,377, filed on Apr. 28, 2021, now Pat. No. 11,268,251.

(51) Int. Cl.
  *E02D 3/02* (2006.01)
  *E02D 3/026* (2006.01)
  *B22D 19/16* (2006.01)

(52) U.S. Cl.
  CPC ........... *E02D 3/0265* (2013.01); *B22D 19/16* (2013.01)

(58) Field of Classification Search
  CPC .......................... E02D 3/0265; B60B 15/025
  See application file for complete search history.

(56) References Cited

U.S. PATENT DOCUMENTS

| | | | |
|---|---|---|---|
| 3,274,908 A | | 9/1966 | Grant |
| 4,668,122 A | * | 5/1987 | Riddle .................... E02D 3/026 172/554 |
| 4,919,566 A | * | 4/1990 | Caron ..................... E02D 3/026 172/554 |
| 6,632,045 B1 | | 10/2003 | McCartney |
| 6,682,262 B2 | | 1/2004 | Caron |
| 6,991,401 B1 | | 1/2006 | Caron |
| 7,108,452 B2 | | 9/2006 | Caron |
| 8,449,218 B2 | * | 5/2013 | McPhail ................. E02D 3/026 404/124 |
| D729,852 S | * | 5/2015 | Brockway ...................... D15/28 |
| 10,731,310 B2 | * | 8/2020 | McCartney ........... E02D 3/0265 |

(Continued)

FOREIGN PATENT DOCUMENTS

WO 200186075 A2 11/2001

OTHER PUBLICATIONS

Partial Search Report issued in PCT/GB2022/051061.
Office action dated Jul. 2, 2021 in U.S. Appl. No. 17/243,377, filed Apr. 28, 2021.

*Primary Examiner* — Gary S Hartmann
(74) *Attorney, Agent, or Firm* — Jeffer Mangels Butler & Mitchell LLP; Brennan C. Swain, Esq.

(57) ABSTRACT

A guard for a compactor vehicle that includes a base and a cap. The base comprises a body and a retention feature. The body defines an underside, configured to engage a wheel of the compactor vehicle, and an opposing cap-facing side. The cap comprises an outer surface and a retention feature. The outer surface defines a compaction surface. The retention features of the base and cap interlock with one another to secure the cap to the base. A cavity is defined in the underside of the base.

15 Claims, 12 Drawing Sheets

(56) References Cited

U.S. PATENT DOCUMENTS

| | | |
|---|---|---|
| 10,787,785 B2 | 9/2020 | McCartney |
| 11,208,781 B2 * | 12/2021 | McCartney ........... E02D 3/0265 |
| 11,268,251 B1 * | 3/2022 | McCartney ........... E02D 3/0265 |
| 2003/0099514 A1 | 5/2003 | Livesay |
| 2013/0051915 A1 | 2/2013 | Brockway |
| 2019/0032295 A1 | 1/2019 | McCartney |

* cited by examiner

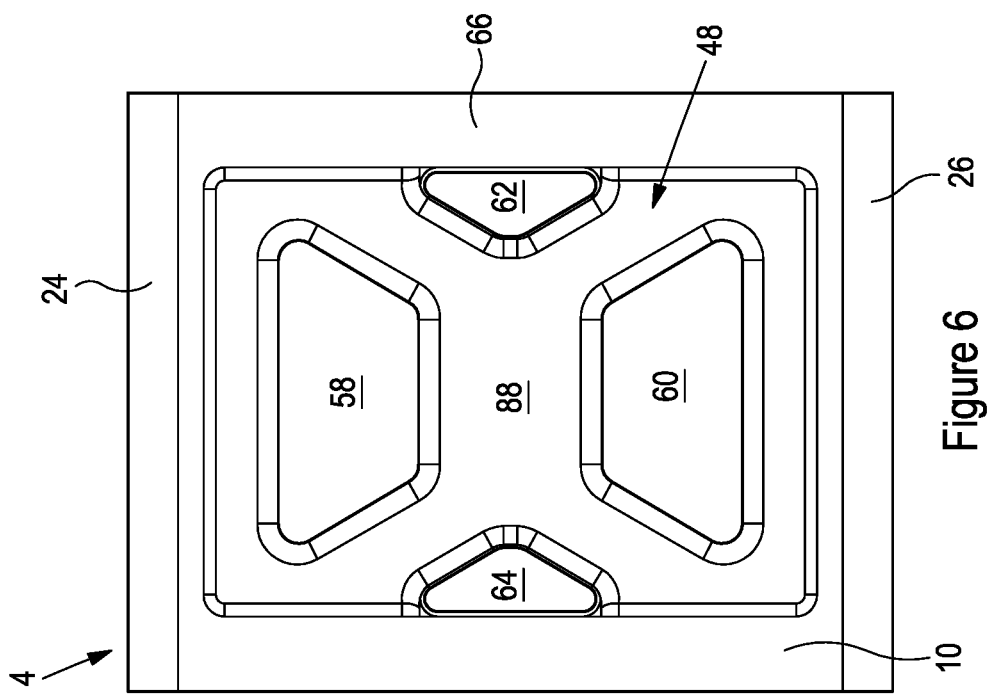
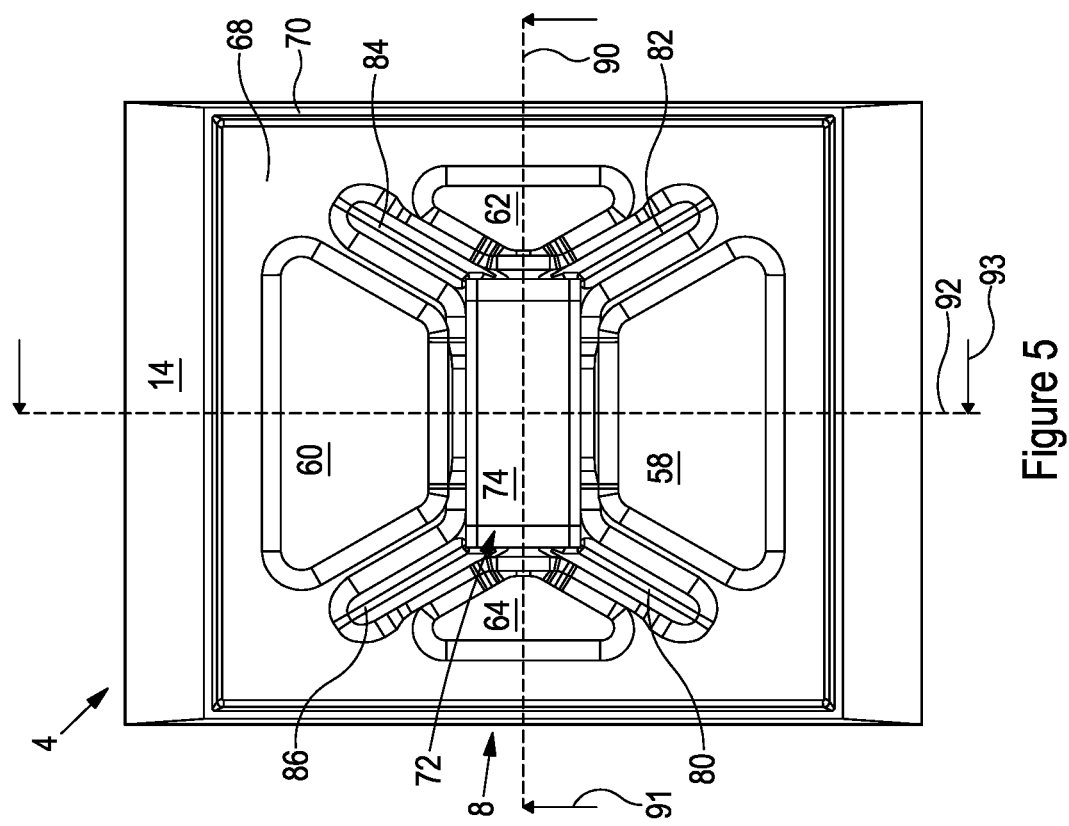

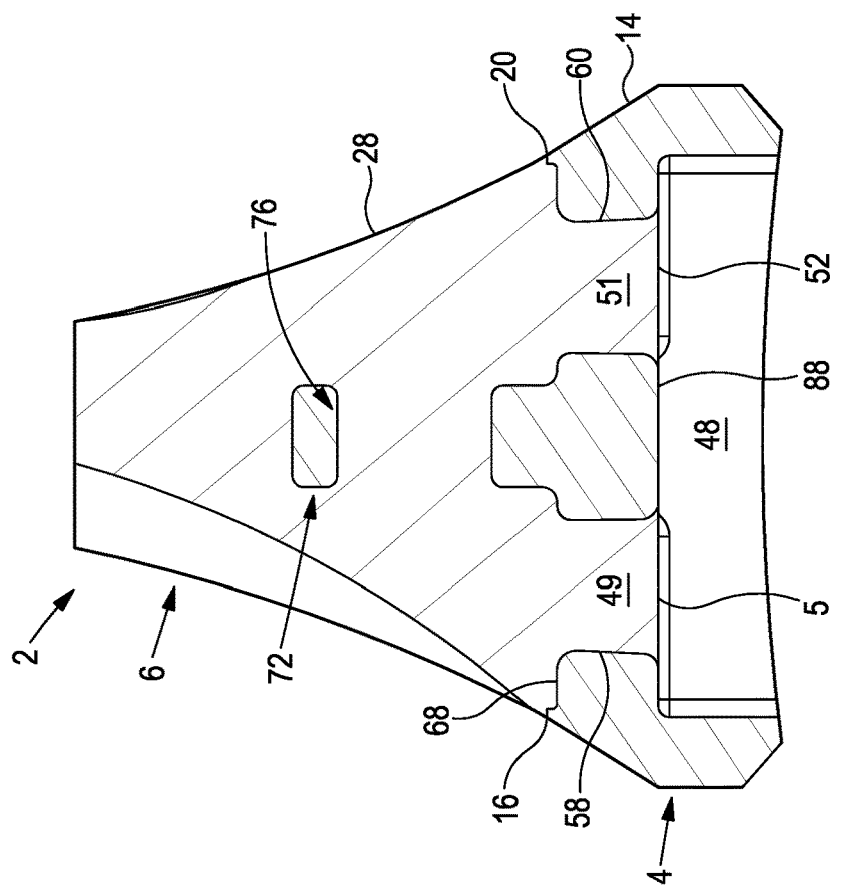
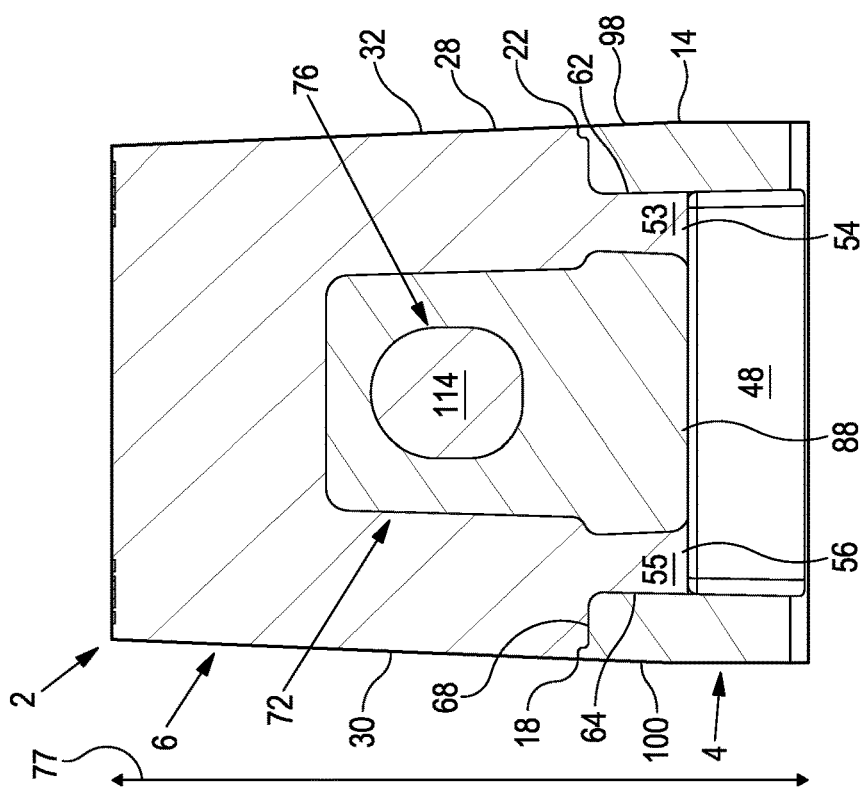

GUARD FOR COMPACTOR VEHICLE AND ASSOCIATED METHOD

FIELD OF THE INVENTION

The present invention relates to a tooth for a compactor vehicle wheel, an associated method, a base for a compactor tooth, a guard for a compactor vehicle wheel, and a compactor vehicle.

BACKGROUND OF THE INVENTION

Landfill sites are sites where waste material is disposed of by burying the material beneath the ground surface or by simply letting the waste material accumulate over such surface.

Despite recent efforts to recycle more waste material in order to reduce the amount of waste material arriving at landfill sites, a significant proportion of waste material is still disposed of in this way. Whether waste material is not recyclable or if recycling is not available in that locality, landfill is, in some instances, the only option for disposing of waste material.

In order to reduce the cost of operating such landfill sites, it is necessary to compact the waste material. Compacting the waste material reduces the volume of waste material, thereby allowing more waste material to be disposed of in any given volume of space.

Compaction of waste material can occur in a number of different ways. However, the most common way of compacting waste material is to use heavy machinery. Large steel-wheeled vehicles, often referred to as landfill compactor vehicles, traverse landfill sites in order to compact and/or break apart waste material.

Landfill compactor vehicles may have large steel-drum wheels with teeth on their outer surface. These toothed wheels also provide traction for the compactor vehicles. Landfill compactor vehicles are large vehicles with a considerable mass. The teeth of the wheels are therefore placed under considerable stress due to the weight of the vehicle being supported by the teeth as well as the requirement to compact the landfill waste.

It is therefore desirable that the teeth have a high structural strength and that the teeth be securely connected to the landfill compactor vehicle wheels so as to allow the teeth to withstand the high loading forces experienced during operation.

Furthermore, because landfill compactor vehicles spend their operational lives compacting waste material, their teeth are liable to wear down and inevitably require replacing.

It is also therefore desirable that these teeth are also hard wearing such that they do not wear down too quickly in use.

Other varieties of compactor vehicles, which may suffer from similar disadvantages, include soil and rock compactor vehicles.

There exists a need to overcome one or more disadvantages associated with prior art arrangements, whether mentioned in this document or otherwise.

SUMMARY OF THE PREFERRED EMBODIMENTS

According to a first aspect of the invention there is provided a tooth for a compactor vehicle, the tooth comprising a base and a cap;
wherein the base comprises:
a body defining an underside, configured to engage a wheel of the compactor vehicle, and an opposing cap-facing side; and
a retention feature;
wherein the cap comprises:
an outer surface defining a compaction surface; and
a retention feature;
wherein the retention features of the base and cap interlock with one another to secure the cap to the base; and
wherein a cavity is defined in the underside of the base.

The tooth may be referred to as a compaction tooth or a compactor tooth. The tooth may be described as a compactor vehicle wheel tooth.

The compactor vehicle may be one of a number of different types of compactor vehicle, such as a: landfill, soil or rock landfill compactor vehicle.

The base may refer to a component which provides an attachment surface, such as the underside, for securing the tooth to a wheel of the compactor vehicle. The base may generally occupy a lower portion of the tooth. The base may be attached to the wheel of the compactor vehicle by welding and/or by one or more fasteners.

The cap refers to a component which provides a tip, of sorts, for, and generally over, the base. In use, it is the cap which provides the majority of the compacting action as the compactor vehicle traverses a surface. The cap may surround at least part of the base such that part of the base is obscured from view once the cap is attached to the base. Part of an outer surface of the base may also provide some compacting action e.g. kneading action.

The base may be made of a material suitable for welding to facilitate attachment of the base to the wheel, an example of such a material being steel. The base may be made of, for example, A3 tool steel.

The base and cap may be cast using one or more metal materials. Non-limiting examples of metal materials include pure metals and alloys. The base is preferably cast using a metal material which is readily weldable. The cap is preferably cast using a comparatively high-wearing material e.g. a material having a high hardness value. The cap may be made from, for example, a variation of white iron and/or high alloy steel.

The body may be generally cuboidal. That is to say the body may generally comprise two pairs of generally parallel sides. The body preferably has a width and depth which is greater than a thickness of the body. The body may be described as block-like. The underside may be the lowermost surface of the body. The underside may be defined by a peripheral edge which surrounds the cavity. The body may comprise one or more features to facilitate welding proximate the underside, such as chamfered edges. The body being configured to engage a wheel of the compactor vehicle wheel may be described as the body being attachable to, or securable to, a wheel of the compactor vehicle. The wheel of the compactor vehicle may be a drum and so the body may be attachable to a drum of the compactor vehicle wheel. The body may be attachable to the wheel of the compactor vehicle wheel by welding and/or by one or more fasteners. The underside may be at least partly arcuate to facilitate the mating of the underside of the base with the wheel.

The cap-facing side opposing the underside refers to there being a height offset between the underside and the cap-facing side. It will be appreciated that the underside may be arcuate whereas the cap-facing side may be generally planar.

The retention feature of the base may be defined on the body. Alternatively, the retention feature of the base may be defined by an attachment portion which projects from the body. The base may comprise a plurality of retention features (e.g. provided as both part of the body and the attachment portion). The retention feature may be referred to as a base retention feature. The retention feature may take the form of an aperture provided in the attachment portion. The retention feature may take the form of one or more recesses, for example an array of recesses, provided in the body. The retention feature generally refers to a feature which can receive material from the cap so as to lock, secure, or mate, the base and cap together. In preferred embodiments the base comprises a plurality of retention features comprising an array of recesses and an aperture which extends through the attachment portion.

The outer surface of the cap defining a compaction surface may otherwise be described as the cap defining a working surface which, in use, deforms or destroys material underneath the compactor vehicle wheel, and specifically underneath the tooth. The compaction surface of the cap may meet an outer surface of the body at one or more join lines. The combination of the outer surface of the body and the compaction surface of the cap may define a substantially continuous outer surface of the tooth. The compaction surface of the cap may comprise a number of different features including flat faces, arcuate surfaces, arcuate recesses and chamfers. An outer tip of the compaction surface may be dumbbell-shaped or M-shaped. It will be appreciated that a number of other alternative geometries may be defined at the outer tip of the cap.

The retention feature of the cap may refer to a portion of material which extends through an aperture of the base. For example, the retention of the feature of the cap may be a generally tubular body, which may be referred to a portion of material. Alternatively, or in combination, the retention feature of the cap may comprise one or more projections. Said one or more projections may extend outwardly, in cross-section, along a length of the projections. In an outermost position, e.g. at an outer end of the projections, the projections may extend outwardly, or splay outwardly, to anchor the cap to the base. The one or more projections may be said to generally taper outwardly. The outward tapering may define an hourglass-shaped, or C-shaped, projection having wider ends and a narrower middle.

The retention features of the base and cap interlocking with one another is intended to mean that there is an engagement between the features which would secure the features together even in the absence of any metallic bonding between those features. For example, a portion of material (e.g. a loop) extending through an aperture (e.g. of a handle-like projection), or an outwardly tapering projection extending through a corresponding tapering recess, are examples of retention features which interlock with one another. It is the interlocking between the retention features that means the cap remains secured to the base, or attached to the base. The retention features are preferably defined when at least one of the cap and the base is still in a molten metal material form (before said material cools to define a solid component). Using this process, features, such as undercuts, can be incorporated. In preferred embodiments it is the cap which is cast, using a (second) molten metal material, onto a precast base. Put another way, the base is first cast using a (first) molten metal material. Once the base solidifies, the cap is cast onto the base. The cap may be described as being configured to be cast onto the base using a molten metal material, which may be a second molten metal material. For completeness, there is also a metallic bonding which connects the cap to the base. Put another way, the cap is bonded to the base. There may also be an element of 'blending' between the molten metal material of the cap, and the base, during manufacture.

The cavity being defined in the underside of a base refers to a volume which is substantially free of any material. The cavity therefore refers to an open space, or volume. The cavity being defined in the underside of the base may otherwise be described as the underside being a solid surface if not for the incorporation of the cavity. The base may comprise a single cavity. Alternatively, the base may comprise a plurality of cavities. Where the base comprises a plurality of cavities, one or more walls (e.g. ribs) may interpose the cavities. The walls may define a supporting structure. One example of a supporting structure comprises walls which extend between corners of the base in a diagonal manner. Said supporting structure advantageously increases the rigidity of the base. The supporting structure may provide bosses through which fasteners can be attach the base, and so tooth, to the wheel. One example is to drill bores, and tap threads, in the supporting structure. Alternatively, or in combination, pre-cast threads may be incorporated.

Advantageously, the incorporation of the cavity in the underside of the base reduces the amount of material required to cast at least the base. This, in turn, reduces the mass of the base (and so tooth) and the associated cost of manufacture. Furthermore, advantageously the presence of the cavity means that the thermal mass of the base is reduced. During manufacture, the temperature of the base thus increases more readily, in comparison to a base without a cavity. The rate of heat transfer from the molten cap material to the base is thus lower, providing a more steady cooling rate (of the cap material) and reduced risk of chillback (i.e. excessive contraction of the molten metal cap material, which could lead to crack formation). Put another way, there is a reduced thermal shock when introducing the cast metal material, used to manufacture the cap, to the base.

Further advantageously, the incorporation of the cavity, which is free of material, reduces the requirement for further manufacturing processes after the base and cap have been cast. Specifically, in prior art arrangements it may have been necessary to grind a lower surface of the base, to a significant degree, owing to the generally solid nature of the base. In some arrangements, cap material may also have needed to have been ground. Advantageously, the presence of a cavity reduces the amount of grinding which is required because the surface area of the underside of the base is reduced.

Welding the base to the wheel has also been found to be advantageously improved by incorporation of the cavity. This is owing, at least in part, to the lower thermal mass of the base drawing less heat during the welding process.

The cavity may be bound by a peripheral edge which extends around the underside of the base.

The cavity being bound by a peripheral edge may otherwise be described as the cavity being defined by the peripheral edge, or the cavity being surrounded by the peripheral edge. The peripheral edge may be said to define a border, e.g. an outermost lower edge, of the base. It may be a peripheral edge, or at least part thereof, which is welded to the compactor vehicle wheel to secure the tooth to the wheel.

The peripheral edge extending around the underside of the base may be described as the peripheral edge extending entirely around the underside of the base. That is to say, a closed loop of material may be defined.

Advantageously, a single, open cavity can be employed which reduces any grinding or finishing processes required. Furthermore, the amount of material effectively removed from the base, and so the extent to which the mass and cost is reduced, are further increased in comparison to if, for example, the recess was only a comparatively small recess provided at one point in the base.

In embodiments where a plurality of cavities are incorporated, the peripheral edge may be said to bound the plurality of cavities.

The cavity may be generally cuboidal.

The cavity being generally cuboidal refers to the cavity having two pairs of generally parallel sides when viewed in plan. The cross-section of the cavity, taken in plan, may therefore be rectangular or square. In preferred embodiments the heights, or thickness, of the cavity is comparatively less than a width and depth of the cavity. A negative of the cavity may be said to be similar to a thickened plate in geometry.

Advantageously, a generally cuboidal cavity is readily manufactured and defines a significant volume of cavity.

The body may comprise:
 a first portion, which defines at least the underside; and
 a second portion, which extends from the first portion and generally tapers in a direction moving away from the underside.

The second portion may be said to extend directly from the first portion. The combined heights of the first and second portions may be equal to a height of the body of the base. The second portion may taper in a linear manner or in an arcuate manner. The second portion tapering in a direction moving away from the underside refers to the second portion having a greater cross-sectional area proximate the underside, and a reduced cross-sectional area distal the underside.

The cavity may extend through at least a majority of the first portion of the base.

The cavity may extend through an entirety of a thickness of the first portion of the base. Alternatively, the cavity may extend through only a portion of the first portion of the base. The cavity extending through at least a majority of the first portion of the base refers to the proportion of a height of the first portion of the base which the cavity extends through. The cavity may extend through at least 75%, preferably at least 90% of a height of the first portion. A widest point of the base may be defined in the first portion, optionally directly between the first and second portions.

The base may further comprise one or more recesses, the one or more recesses extending between the cavity and the cap-facing side.

The base may comprise a plurality of recesses and, in preferred embodiments, comprises four recesses. All of the recesses may be the same geometry, or there may be a mixture.

In preferred embodiments the four recesses can be grouped into two pairs of recesses. The recesses extending between the cavity and the cap-facing side is intended to mean that the recesses place the cavity in fluid communication with the cap-facing side (in the absence of cap material). The recesses may define retention features in that molten metal material of the cap, when the cap is cast onto the base, may flow through the recesses. Once the cap material cools, the cap material may form projections and anchor the cap to the base by engagement with the recesses. To facilitate this, the recesses preferably comprise an anchoring feature, such as an undercut, which anchors the cap in position once the cap material has solidified. The recesses may generally increase in cross-sectional area, towards an outer surface. This may take the form of the recesses splaying outwardly, or extending outwardly, at least at an outer surface. Such geometry improves the interlocking of the projection and the recess, and so the cap and the base.

Advantageously, the one or more recesses extending between the cavity and the cap-facing side provide a secure join between the cap and the base. This can still be achieved whilst the cavity remains free of material, and so the advantages associated with the presence of the cavity can be obtained. Generally speaking, the more retention features which are incorporated, and the stronger the interconnection between the cap and the base and thus the harder wearing the tooth will be.

The one or more recesses may be generally trapezoidal.

The one or more recesses being generally trapezoidal refers to a geometry of the recesses when taken in plan view. Generally trapezoidal refers to the recesses having one pair of generally parallel sides and one pair of non-parallel sides. The one or more recesses may be said to be tapered, or dovetail-shaped, moving from an outer periphery of the base towards the central point.

One of more of the recesses may be described as generally triangular. Where an array of recesses is incorporated, some recesses (e.g. first pair) may be generally trapezoidal whilst some recesses (e.g. a second pair) may be generally triangle.

The base may further comprise an attachment portion which projects from the cap-facing side.

The attachment portion refers to a feature which facilitates attachment of the cap to the base. The attachment portion projecting from the cap-facing side is intended to mean that the attachment portion extends from the cap-facing side, and is preferably provided at a greater height than the cap-facing side. The attachment portion may be generally cuboidal and may be described as tab-shaped. The attachment portion may define a tallest point of the base e.g. at an outer tip of the attachment portion. The attachment portion may be general obscured from view once the cap is cast onto the base.

Advantageously, the attachment portion provides a further feature by which the cap can be secured to the base.

Advantageously, the attachment portion projecting from the cap-facing side means that a reduced amount of cap material is needed, the cap material typically being more expensive than the base material owing to its hardwearing nature.

The attachment portion may define a retention feature of the base, optionally the retention feature of the base.

The attachment portion may define the retention feature introduced in connection with the above aspect of the invention, or may define a further retention feature of the base, i.e. there may be multiple retention features. The attachment portion is preferably incorporated, along with a plurality of recesses, the combination of the attachment portion and the recesses providing a plurality of retention features of the base.

The retention feature of the base may comprises an aperture which extends through the attachment portion.

The aperture may be said to extend entirely through the attachment portion. The combination of the aperture and the attachment portion may define a handle-like feature. That is to say, the attachment portion may project from the cap-facing side and the aperture may extend therethrough, giving the appearance like a handle.

The attachment portion may comprise a single aperture. The aperture may extend across a majority of the attachment portion. That is to say, a majority of major (e.g. the largest)

faces of the attachment portion may be defined by the aperture. Alternatively, the attachment portion may comprise a plurality of apertures.

In embodiments where the cap is cast onto the base, molten metal material used to cast the cap may be poured onto the cap-facing side (of the base) and flow through the aperture. This preferably occurs whilst the molten metal material is at least partly molten. Once the molten metal material solidifies, the material which extends through the aperture, which may be described as a portion of material, preferably defines a retention feature which interlocks with the aperture. The aperture may define a retention feature.

Advantageously, the aperture extending through the attachment portion provides a robust retention feature which can be used to improve the interlock between the base and the cap. The tooth is therefore more robust by virtue of the aperture extending through the attachment portion.

A land of material may be defined between the cap-facing side and a lowermost point of the aperture.

The land of material refers to a solid block of material. Put another way, the land of material refers to a solid volume of material. The land of material may be generally cuboidal. The land of material may be described as generally bar-like. The land of material being defined between the cap-facing side and the lowermost point of the aperture may otherwise be described as the aperture being defined above the land of material. The land of material may be said to interpose the aperture and the cap-facing side.

Advantageously, the land of material being provided between the aperture and the cap-facing side improves the robustness of the base by reducing deflection of the base. Specifically, when the molten metal material, in some embodiments, of the cap is cast onto the base, there is a tendency for the base material to absorb heat from the molten material of the cap and thus thermally expand. Owing to the presence of the cavity in the underside of the base, the thermal expansion, and possibly distortion, may be worsened, due to a reduced amount of material and reduced reinforcement of the base. Advantageously, by incorporating the land of material a rib of sorts may be provided across the base so as to reinforce the base, specifically the body thereof, to reduce the distortion or deflection. Furthermore, the land of material being provided below the aperture reduces the risk that the lack of material, owing to the aperture, could itself result in further deflection by again providing reinforcement in this area.

The aperture may be a generally arcuate aperture.

The aperture being a generally arcuate aperture is intended to mean that a majority of the edges of the aperture are arcuate. Put another way, rather than the aperture being, for example, generally cuboidal and having only relatively sharp fillets at the corners, a generally arcuate aperture refers to an aperture which has at least large fillets in the corners so as to reduce the presence of straight edges and surfaces. Alternatively, the generally arcuate aperture may be entirely arcuate e.g. be circular (i.e. a bore in three dimensions) or elliptical. The generally arcuate aperture may be defined as less than around 30%, preferably less than around 25% or 20%, of a perimeter of the aperture being defined by linear edges. This is another way of describing the majority of the perimeter being defined by arcuate edges.

Advantageously, the presence of a generally arcuate aperture reduces any other comparatively sharper fillets which, given a possible high temperature manufacturing method, could lead to thermal cracks developing in either the base or the cap.

One or more buttresses may extend between the attachment portion and the cap-facing side.

Buttresses is intended to refer to a supporting projection. The buttresses are preferably generally diagonal when the base in viewed in plan. Buttresses may be generally triangular when viewed normal to a major face of the buttresses.

The buttresses may be of the form of a generally right angled triangle wherein one of the perpendicular sides extends from the cap-facing side, and the other of the perpendicular sides extends from the attachment portion.

The buttresses advantageously provide improved attachment, and support, of the attachment portion relative to the body of the base. Specifically, the buttresses provide reinforcement which reduces the risk that the attachment portion become detached from the cap-facing side and/or be deflected relative to the cap-facing side.

In preferred embodiments, the attachment portion is generally cuboidal. In preferred embodiments a buttress extends from each corner of the attachment portion towards a corner of the body of the base. Furthermore, in some embodiments a respective buttress extends between two of a plurality of recesses defined in the cap-facing side. In some embodiments an array of four recesses may be provided in the cap-facing side, with a respective one of four buttresses extending between two of the four recesses. When viewed in plan such buttresses may therefore define a generally X-shaped geometry.

The base may comprise a lip which extends around a peripheral edge of the cap-facing side.

The lip may be said to extend entirely around a peripheral edge of the cap-facing side. As such, the lip may define an outermost edge of the cap-facing side. The lip may comprise one or more filleted edges. The lip may be said to extend around a second portion of the body of the base, and the second portion may be tapering. The lip may define an uppermost point, or tallest point, of the body of the base.

Advantageously, incorporation of the lip reduces the risk of chill back occurring when the cap is cast onto the base. Specifically, cracks may occur around the join line between the cap and the base, and particularly in the cap, as the molten metal material solidifies more quickly when the relatively hot molten material meets the relatively cool base (the base having a comparatively large thermal inertia). Providing the lip means that the base increases in temperature locally (i.e. at least at the lip) more readily than base would otherwise. This provides for a more even cooling effect, of the molten metal material of the cap, and reduces the risk of unsightly and/or structurally weakening cracks occurring during manufacture.

According to a second aspect of the invention there is provided a method of manufacturing a tooth according to the first aspect of the invention, the method comprising:
  casting the base using a first molten metal material;
  casting the cap onto at least the cap-facing side of the base using a second molten metal material;
  wherein the retention features of the base and cap interlock with one another to secure the cap to the base whilst the second molten material is at least partly molten; and
  wherein the second molten metal material is substantially prevented from entering the cavity.

In preferred embodiments the base is cast using the first molten metal material in a first step. In preferred embodiments, in a second step the cap is cast onto the pre-cast (e.g. solidified) base. The base is preferably allowed to cool, and so solidify, before the molten metal material of the cap is introduced. This method of manufacturing may be referred to as a twin-shot casting method. The first and second molten metal materials are preferably different to one another, such that the preferred characteristics associated with the base and cap can be obtained in a single, structurally robust tooth.

The first molten metal material is preferably a readily weldable material, such as a high carbon steel. The second metal material is preferably a comparatively hard wearing material, such as a material having a high hardness value.

The second molten metal material may be introduced, or poured, from above the base (e.g. above the cap-facing side thereof). The cap may be said to be cast onto the base.

The retention features, which interlock with one another, may be formed when the molten metal material of the cap is cast onto the base. For example, the second molten metal material may flow through features of the base, such as recesses and aperture(s), to form projections and/or portions of material which, once solidified, securely interlock the base and cap.

The second molten metal being substantially prevented from entering the cavity is intended to mean that the cavity remains free of material during the manufacturing process. It will be appreciated that a very small amount of the second molten metal material may enter the cavity but that the cavity remains generally free of material.

A mould used to cast the base and/or cap may be stationary whilst the first and/or second molten metal materials are poured and/or whilst they solidify.

Advantageously, the aforementioned method of manufacture reduces the grinding requirement required to finish a manufactured tooth. In prior art arrangements it may be necessary to grind the base, e.g. the entire underside thereof, in order to provide an acceptable finish (e.g. before welding). In contrast, the aforementioned method reduces the area which may be ground because the cavity is defined in the underside and therefore eliminates a significant amount of the surface area which contacts the compactor vehicle wheel.

The method advantageously uses a reduced amount of material owing to the presence of the cavity. It will be understood that the cavity would otherwise be full of material, with the associated increased costs and mass implications, if it wasn't for incorporation of the cavity.

The second molten material being substantially prevented from entering the cavity may otherwise be described as the cavity being sealed from the second molten material. The cavity may be said to be isolated from the second molten metal material.

The first or second molten metal materials may otherwise be described as cast metal materials.

The second molten metal material may be substantially prevented from entering the cavity by a blocking element such as a pattern or core.

The blocking element refers to a device which is able to facilitate the substantial prevention of the second molten metal material from entering the cavity. The blocking element may be described as a seal of sorts, or a baffle or barrier. The blocking element, which may be a pattern, may be said to plug the cavity during casting of the cap.

In this instance pattern refers to a body which generally corresponds to an exterior of the cap. The presence of the pattern may thus substantially prevent the second molten metal material from entering the cavity.

The core may be a destructible core which substantially prevents the second molten metal material from entering the cavity and which is destroyed after use. The core may be a sand core. The cavity may be cleaned out and/or fettled following removal of the core.

Advantageously, the blocking element provides a reliable and repeatable way of substantially preventing the second molten metal material from entering the cavity. Furthermore, the blocking element is readily useable and does not risk damage to the pre-cast base.

The second molten metal material may flow through the one or more recesses to secure the cap to the base.

The second molten metal material flowing through the one or more recesses to secure the cap to the base will be appreciated to mean that the cap may be secured to the base only after the second molten metal material has solidified.

The recesses preferably incorporate a geometry which defines one or more anchoring features. For example, the recess may splay outwardly at a distal end such that when the second molten metal material solidifies around that feature, the defined feature (e.g. a projection) cannot be withdrawn from the recess (owing to the anchoring effect in that the formed feature generally extends outwardly beyond the recess).

Where a plurality of recesses are incorporated, each of the plurality of recesses may receive the second molten metal material such that the recesses collectively facilitate securing of the cap to the base.

The second molten metal material may flow through the aperture of the attachment portion to secure the cap to the base.

The second molten metal material flowing through the aperture may otherwise be described as the second molten metal penetrating the aperture. As suggested by the name, this occurs whilst the cap material is at least partly molten. Once the second molten material solidifies, a portion of the material present within the aperture defines a retention feature which interlocks the base and the cap.

Securing the cap to the base may otherwise be described as fixing or attaching the cap to the base. Manipulating the tooth by contacting only the cap or the base results in both the cap and the base being moved together.

Advantageously, the second molten metal material flowing through the aperture provides a secure means of attaching the cap to the base. This also allows for the use of different metal materials for the cap and base, which may each have different characteristics depending on their different purposes.

According to a third aspect of the invention there is provided a base for a compactor vehicle tooth, the base comprising:
  a body defining an underside, configured to engage a wheel of a compactor vehicle, and an opposing cap-facing side; and
  an attachment portion which projects from the cap-facing side of the base and comprises a generally arcuate aperture;
  wherein the generally arcuate aperture extends through the attachment portion and is configured to interlock with a retention feature of a cap.

The aperture being a generally arcuate aperture is intended to mean that a majority of the edges of the aperture are arcuate. Put another way, rather than the aperture being, for example, generally cuboidal and having only relatively sharp fillets at the corners, a generally arcuate aperture refers to an aperture which has at least large fillets in the corners so as to reduce the presence of straight edges and surfaces. Alternatively, the generally arcuate aperture may be entirely arcuate e.g. be circular (i.e. a bore in three dimensions) or elliptical. The generally arcuate aperture may be defined as less than around 30%, preferably less than around 25% or 20%, of a perimeter of the aperture being defined by linear edges. This is another way of describing the majority of the perimeter being defined by arcuate edges.

Advantageously, the presence of a generally arcuate aperture reduces any other comparatively sharper fillets which, given a possible high temperature manufacturing method, could lead to thermal cracks developing in either the base or the cap.

A cavity may be defined in the underside of the base.

A land of material may be defined between the cap-facing side and a lowermost point of the generally arcuate aperture.

According to a fourth aspect of the invention there is provided a tooth for a compactor vehicle, the tooth comprising the base according to the third aspect of the invention, and a cap, wherein a retention feature of the cap interlocks with the generally arcuate aperture of the base to secure the cap to the base.

According to a fifth aspect of the invention there is provided a guard for a compactor vehicle wheel, the guard comprising a base and a cap;
wherein the base comprises:
a body defining an underside, configured to engage the wheel of the compactor vehicle, and an opposing cap-facing side; and
a retention feature;
wherein the cap comprises:
an outer surface; and
a retention feature;
wherein the retention features of the base and cap interlock with one another to secure the cap to the base; and
wherein a cavity is defined in the underside of the base.

The guard is a component which protects the compactor vehicle from debris. The guard may be described as a cleat guard. The guard may define a barrier, or shield, of sorts. In preferred embodiments the guard is attached to the wheel of the compactor vehicle at an inner position (i.e. towards a main body of the vehicle). The guard may protect the compactor vehicle by reducing the risk that debris, such as wire and/or strapping, become entangled around, and damage, a main shaft seal provided around an axle which the wheel is mounted to.

The guard may be directly mounted to the wheel (e.g. to the drum). The guard may be mounted to a portion of the wheel which projects outwardly beyond an adjacent portion of the wheel (e.g. on a projecting rim). The projecting rim may define a largest diameter of the wheel (excluding the guard and/or teeth).

According to a sixth aspect of the invention there is provided a compactor vehicle comprising a wheel, wherein one or more of the teeth according to the first or fourth aspects of the invention, and/or one or more of the guards according to the fifth aspect of the invention, are attached to the wheel.

The compactor vehicle may be described as a compaction vehicle. The compactor vehicle may provide functionalities including spreading waste in landfill and compacting the waste in landfill (particularly where the compactor vehicle is a landfill compactor vehicle). The compactor vehicle may be a soil or rock compactor vehicle.

The wheel of the compactor vehicle may be in the form of a drum. The drum may be a steel drum. One or more teeth being attached to the wheel may comprise the one or more teeth being welded to the wheel, such as welded to the drum.

According to a seventh aspect of the invention there is provided a method of manufacturing a guard according to the fifth aspect of the invention, the method comprising:
casting the base using a first molten metal material;
casting the cap onto at least the cap-facing side of the base using a second molten metal material;
wherein the retention features of the base and cap interlock with one another to secure the cap to the base whilst the second molten material is at least partly molten; and
wherein the second molten metal material is substantially prevented from entering the cavity.

The optional and/or preferred features for each aspect of the invention set out herein are also applicable to any other aspects of the invention, where appropriate.

BRIEF DESCRIPTION OF THE DRAWINGS

Embodiments of the present invention will now be described, by way of example only, with reference to the accompanying drawings, in which:

FIG. 5 is a plan view of the base shown in FIGS. 3 and 4;

FIG. 6 shows the base of FIGS. 3 to 5 from underneath;

FIG. 11 is a cross-section front view of the tooth shown in FIGS. 1 and 2;

FIG. 12 is a cross-section side view of the tooth shown in FIGS. 1 and 2;

DETAILED DESCRIPTION OF THE PREFERRED EMBODIMENTS

Figure 1:
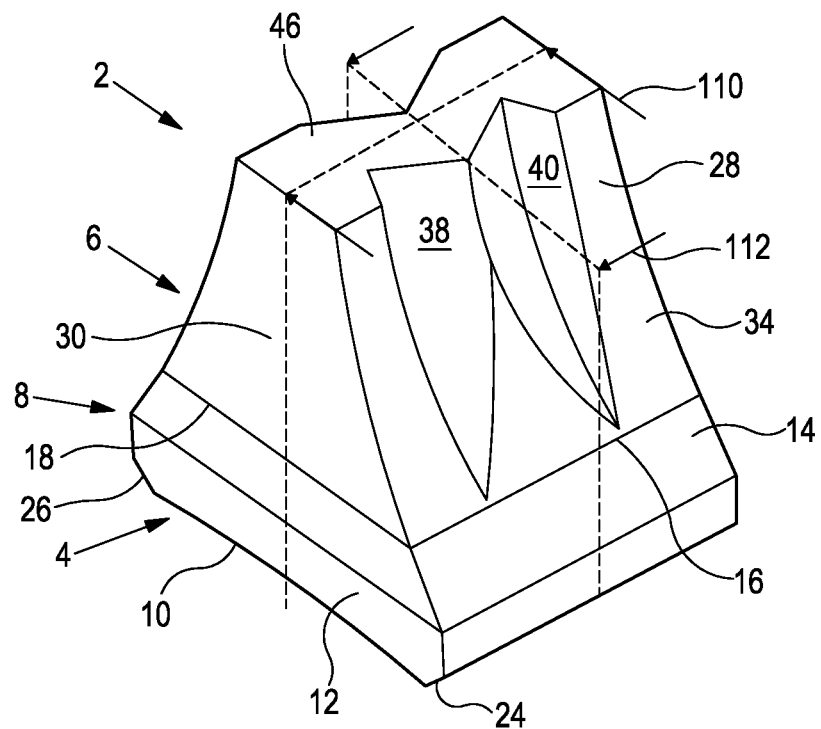
FIG. 1 is a perspective view, generally from above, of a tooth according to an embodiment of the invention.

FIG. 1 is a perspective view of a tooth 2 according to an embodiment of the invention. The tooth 2 comprises a base 4 and a cap 6. The tooth 2 is for a compactor vehicle, specifically a compactor vehicle wheel. In use, the tooth 2 serves to compact, and break up, material.

The compactor vehicle may be one of a number of different types of compactor vehicle, such as a: landfill, soil or rock compactor vehicle. The material which is compacted and/or broken up by the tooth 2, in use, may therefore include landfill waste, soil (e.g. dirt) and/or rocks (e.g. aggregate). In preferred embodiments the tooth 2 is mounted to a wheel of a landfill compactor vehicle, and is used to compact, and break up, landfill waste.

The tooth 2 is manufactured in a two-part casting process, which may be referred to as a twin-shot casting process. In the process, the base 4 is initially cast using a (first) molten metal material and allowed to cool. With the base 4 set (e.g. solidified), the base 4 then forms part of a mould into which a (second) molten metal material, which forms the cap 6, is poured and allowed to set. The tooth 2 can therefore be manufactured to have a weldable base 4 and a hard-wearing cap 6 in a single body (with the two parts secured together). This is achieved by manufacturing the base 4 and the cap 6 from two different materials.

Although not visible in FIG. 1, the base 4 and cap 6 are interconnected by way of one or more retention features which will be described in connection with later figures (and are shown in, for example, FIGS. 11 and 12.)

Returning to FIG. 1, the base 4 comprises a body 8. The body 8 defines the bulk of the base 4. The body 8 defines an underside 10 which, in use, is configured to engage a wheel of the compactor vehicle. As will be appreciated from FIG. 10, in combination with, for example, FIG. 8, the underside 10 may be at least partly arcuate. Providing an at least partly arcuate underside 10 is advantageous in providing a more secure fix, or engagement, of the base 4, and so tooth 2, to a wheel (e.g. a drum) of the compactor vehicle.

Returning to FIG. 1, the body 8 of the base 4 comprises two portions: first and second portions 12, 14. The first portion 12 is a portion which defines the underside 10. The second portion 14 extends from the first portion 12. The second portion 14 generally tapers so as to define a narrowing cross-section of the base 4. The uppermost point of the second portion 14 of the body 8 the base 4 meets the cap 6 at four outer join lines 16, 18 (only two of which are visible in FIG. 1). As will be appreciated from FIG. 1, the join lines 16, 18 define a generally uninterrupted surface between the cap 6 and the base 4, specifically outer surfaces thereof. During manufacture, the molten metal material used to manufacture the cap 6 may outwardly overhang the base 4 (e.g. by between around 5 mm to around 7 mm). Said overhang may be ground, or fettled, back to leave the generally uninterrupted, or flush, surface and to define the outer join lines 16, 18. This has been found to improve the casting process by reducing chillback (e.g. reducing the formation of cracks, proximate the join lines 16, 18, owing to the cap 6 material cooling too quickly during casting).

One distinction of the illustrated tooth 2, over prior art teeth, is that the second portion 14 of the body 8 of the base 4 was previously occupied by material used to manufacture the cap 6. The base 4 has therefore effectively increased in height. This reduces the amount of comparatively expensive molten metal material used to cast the cap.

The first portion 12 further comprises chamfers 24, 26 which facilitate the welding of the base 4 to the wheel of the compactor vehicle. As will be appreciated from FIG. 1, the chamfers 24, 26 extend across an entire width of the base 4. The base 4, and so tooth 2, may only be welded to the wheel at the chamfers 24, 26 (e.g. at two edges of the underside 10). Alternatively, the base 4 may be welded to the wheel at all four edges of the underside 10 (e.g. at chamfers 24, 26 and at the edges which extend between the chamfers 24, 26). Attachment at all sides (e.g. so as to form a seal, of sorts, between the underside 10 and the wheel) advantageously reduces the risk of ingress of material (e.g. debris, fluid etc.) underneath the base 4.

For reasons that will be explained in more detail in connection with FIG. 2, it is the base 4 of the tooth 2 which is a particular focus of the present application.

Returning to FIG. 1, to briefly discuss the cap 6, the cap 6 comprises an outer surface 28 which defines a compaction surface. That is to say, in use, it is the outer surface 28 of the cap 6 which provides a majority of the compacting action, or functionality. The outer surface 28 of the cap 6 defines a number of different features including flat faces 30 (only one which is visible in FIG. 1), arcuate surfaces 34 (only one of which is visible in FIG. 1) and arcuate recesses 38, 40 (only two of which are visible in FIG. 1).

Figure 18:
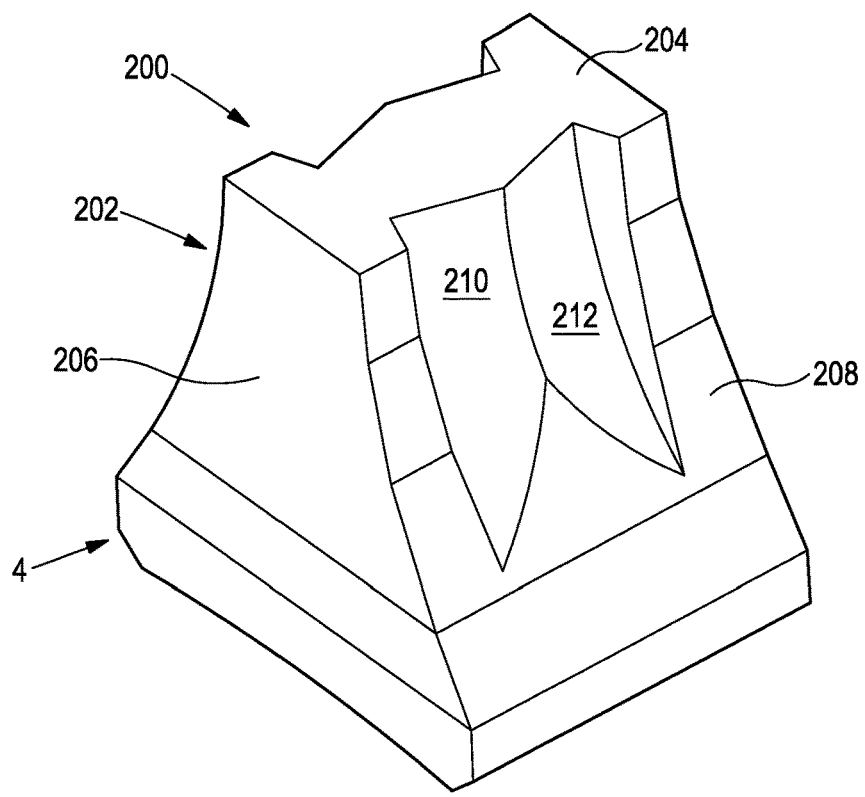
FIG. 18 is a perspective view of a tooth, according to another embodiment, incorporating the same base as the tooth shown in FIGS. 1 and 2, shown generally from above.
Figure 19:
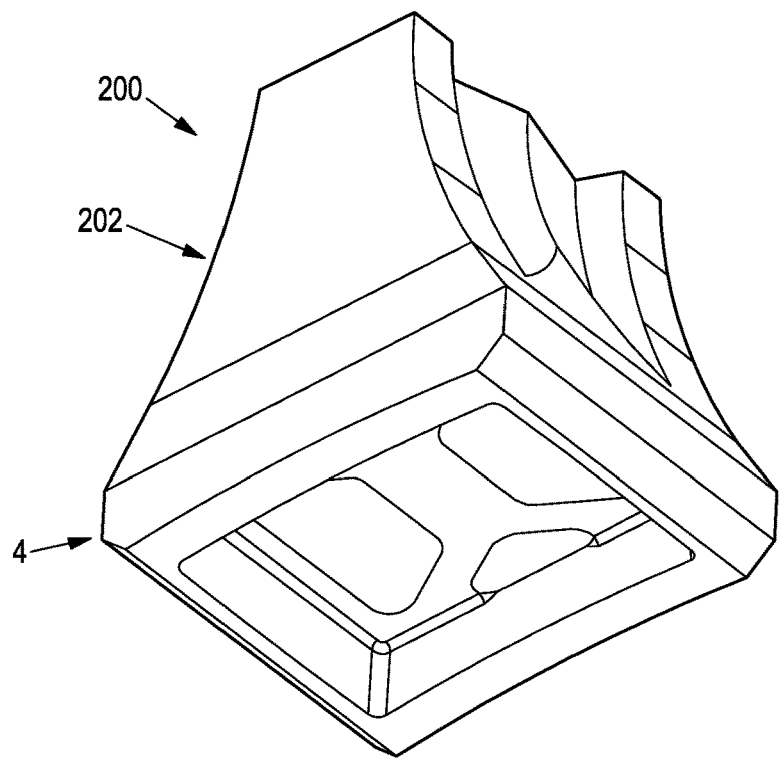
FIG. 19 is a perspective view of the tooth of FIG. 18 shown generally from below.

The cap 6, in the outer surface 28 thereof, defines an outer tip 46. The outer tip 46 refers to an uppermost surface of the tooth 2. The outermost tip 46 is M-shaped illustrated embodiment, but other profiles of outer tip 46 are possible. Indeed, a dumbbell-shaped outer tip is shown in FIGS. 18 and 19, which will be described later in this document.

Figure 2:
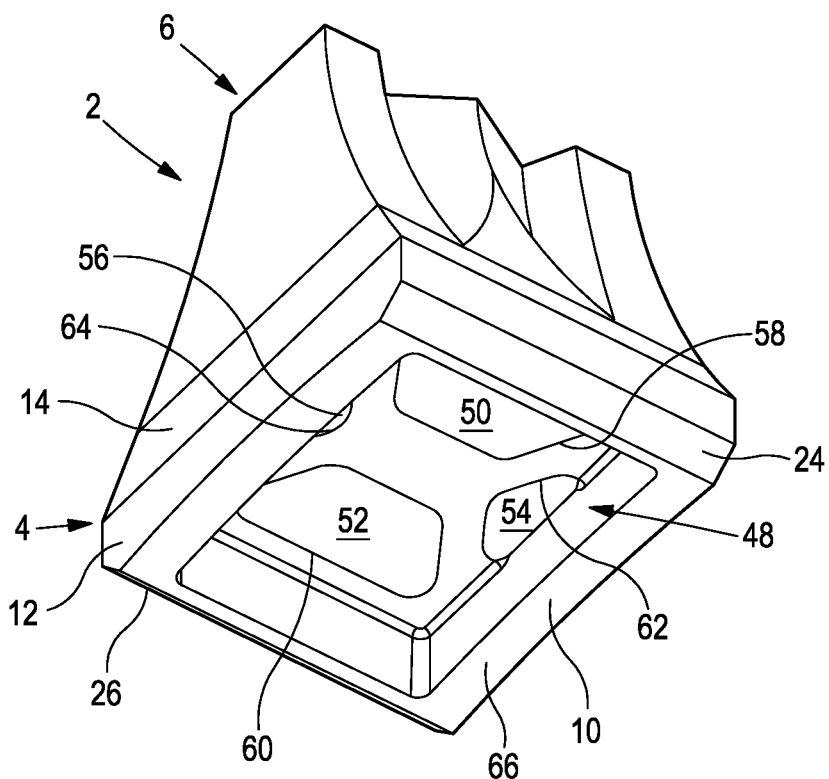
FIG. 2 is a perspective view of the tooth, of FIG. 1, generally from below.

Turning now to FIG. 2, a perspective view of the tooth 2 is provided generally from an underside thereof. The FIG. 2 view shows, more clearly, a cavity 48 which is defined in the underside 10 of the base 4. The cavity 48 is a volume which is free of any material. That is to say, the cavity 48 is not occupied by either base 4 material or cap 6 material. Instead, the cavity 48 exists as a free volume within the base 4.

Advantageously, incorporation of the cavity 48 provides savings in the amount of material required to cast the base 4. Specifically, the amount of a first molten metal material, used to cast the base 4, is reduced. It will therefore be appreciated that there are associated costs, and weight, savings due to the reduction in material which would otherwise be present in place of the cavity 48. The weight savings are particularly advantageous in reducing the loading requirement placed on the transmission of the vehicle (to which the tooth 2 is mounted).

A further advantage of incorporating the cavity 48 is that, in previous arrangements, it may have been necessary to carry out a final manufacturing process on the underside of the base before it be welded to the compactor wheel. For example, a grinding process may have been carried out after both the base and cap had been cast. It may have been necessary to grind a significant amount of material in order to ready the underside for attachment to the compactor vehicle wheel. In the illustrated embodiment, the presence of the cavity 48 reduces the surface area of the underside 10 if the base 4. It will therefore be appreciated that this reduction of surface area provides a corresponding reduction in any grinding process which may be carried out after the tooth 2 has been cast. There are therefore associated time, labour and material cost savings with the reduction, or avoidance, of the further process. Furthermore, should any cap material enter the cavity 48 inadvertently, during the casting process, said material does not need to be ground.

A further advantage of the cavity 48 is that the thermal inertia of the base 4 is reduced. Put another way, the base 4 can more readily increase in temperature in comparison to if the cavity 48 was filled with material (to define a solid block-like base). Generally speaking, the base 4 will be cast first, using a first molten metal material which is then allowed to cool (to solidify the base 4). Once the base 4 has been cast, the cap 6 is generally cast onto the base 4 by using a second molten metal material. The base 4 may therefore form part of the mould which is used to cast the cap 6. When the comparatively hot molten metal material of the cap 6 contacts the comparatively cool precast base, heat is transferred from the molten metal material of the cap 6 to the base 4. In certain zones, particularly around edges of the base 4, the comparatively large thermal mass of the base 4 (and associated high thermal inertia e.g. resistance to temperature change) can lead to excessive cooling and shrinkage, referred to as chill back, of the material used to form the cap 6. This can lead to unsightly and structurally weakening cracks, particularly around the join lines between the base 4 and the cap 6. By incorporating the cavity 48, the thermal inertia of the base 4 is reduced such that the base 4 more readily heats during the casting process when the cap 6 is cast onto the base 4. Advantageously, this reduces the thermal shock experienced by the molten material used to manufacture the cap 6, resulting in a more even cooling process.

A further associated advantage is that less heat is required to weld the base 4 of the tooth 2 to the wheel of the compactor vehicle. Owing to the reduced thermal inertia of the base 4, welds have been found to have improved penetration into the base 4 and the wheel. This is owing, at least in part, to less heat being drawn out of the weld, during the welding process, by an otherwise solid base (which could act as a heat sink of sorts). Put another way, it is walls of the base, forming a peripheral edge of the underside 10, which are welded, rather than an otherwise solid cuboidal base. Cracking associated with the weld(s) may therefore be alleviated.

Although the illustrated embodiment comprises a single cavity 48, in other embodiments a plurality of cavities may be incorporated. Said plurality of cavities may be defined, at least in part, by a supporting structure (e.g. comprising a plurality of walls) define in the underside 10 of the base 4.

Also visible in FIG. 2 are outer ends 50, 52, 54, 56 of projections forming part of the cap 6. These projections are more clearly visible in FIGS. 11 to 17 (labelled 49, 51, 53, 55) and will be described in detail later in this document. Briefly, the projections of the cap 6 are formed when the second molten metal material is cast onto the base 4. The projections are formed by virtue of the molten material flowing through the recesses 58, 60, 62, 64 defined in the base 4. The recesses 58, 60, 62, 64 are more clearly visible in FIGS. 5 and 6.

Figure 9:
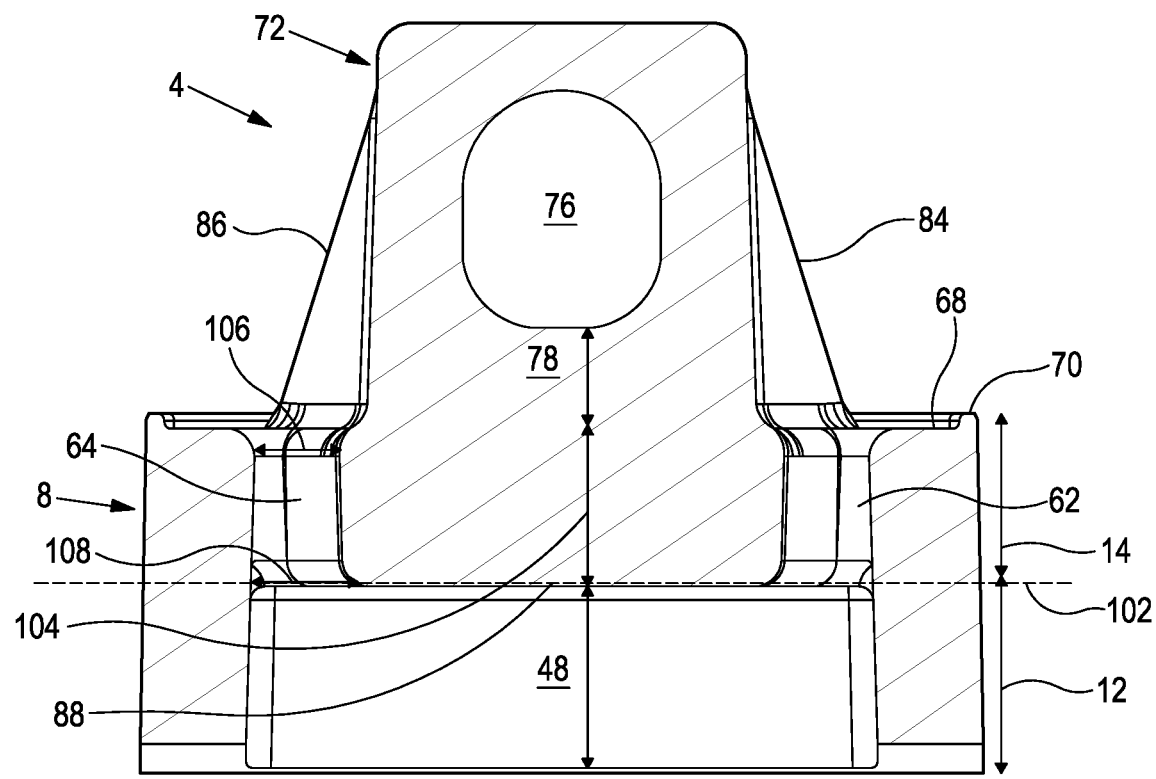
FIG. 9 is a cross-section front view of the base of FIGS. 3 to 8.
Figure 10:
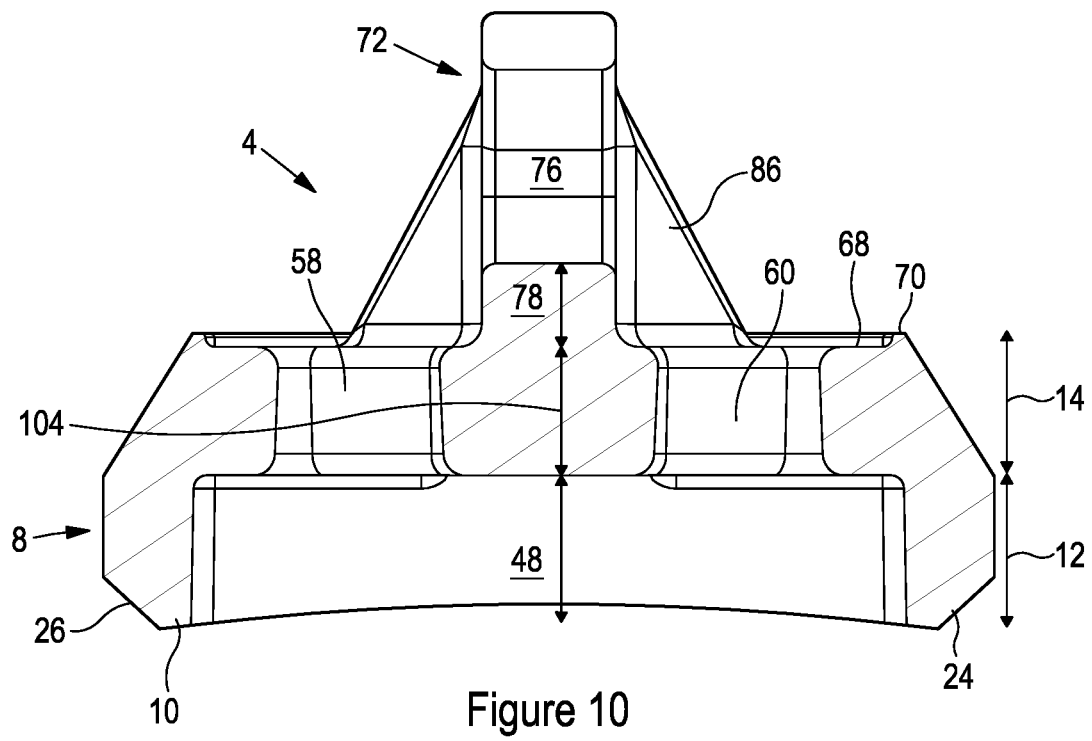
FIG. 10 is a cross-section side view of the base of FIGS. 3 to 9.

Returning to FIG. 2, an outer end of the recesses 58, 60, 62, 64 extends outwardly proximate the recess 48, as shown in FIGS. 9 and 10. Returning to FIG. 2, by allowing the second molten metal material of the cap 6 to occupy the outwardly extending portions of the recesses 58, 60, 62, 64, the corresponding outer ends 50, 52, 54, 56 of the projections share the same geometry. The resulting geometry of the projections, shown also in FIGS. 13 and 14, thus defines retention features which interlock the cap 6 and the base 4.

Returning to FIG. 2, it will be appreciated that the cavity 48 is generally cuboidal. That is to say the cavity 48 is generally defined by two pairs of parallel sides, and has an associated thickness. The cavity 48 is also bound by a peripheral edge 66 which extends around the underside 10 of the base.

Figure 3:
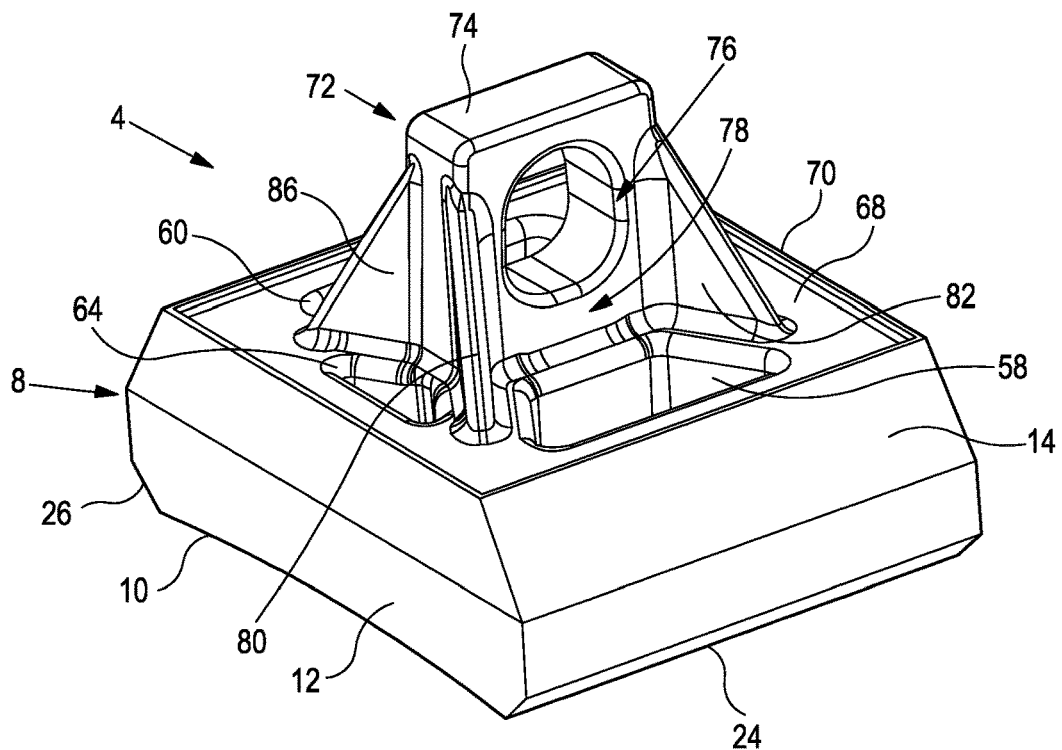
FIG. 3 is a perspective view, generally from above, of a base forming part of the tooth showing FIGS. 1 and 2.

Turning to FIG. 3, a perspective view, generally from above, of the base 4 is provided in isolation. FIG. 3 more clearly shows a number of features of the base 4 which are used to interconnect the cap 6 to the base 4.

As previously described in connection with FIGS. 1 and 2, the base 4 comprises the body 8 which, in turn, comprises first and second portions 12, 14. The first portion 12 defines the underside 10 and chamfers 24, 26. Also shown in FIG. 3 are recesses 58, 60, 64, (62 not being visible in FIG. 3). For ease of reference, the recesses are herein referred to as first recess 58, second recess 60, third recess 62 and fourth recess 64.

FIG. 3 also shows the body 8 of the base 4 defining a cap-facing side 68. As suggested by the name, when the tooth is assembled it is the cap-facing side 68 of the base 4 which faces the cap. The cap-facing side 68 is generally planar and is generally rectangular. The cap-facing side 68 may be said to generally oppose the underside 10 of the base 4. This is owing to the fact that the underside 10 and cap-facing side 68 are generally provided at different ends of the body 8 of the base 4.

The base 4 further comprises a lip 70. The lip 70 extends around a peripheral edge of the cap-facing side 68. The lip 70 may be said to project from the cap-facing side 68.

Advantageously, in use the lip 70 reduces a thermal mass/inertia imbalance between molten metal cap material and the base 4 by more readily heating up than the bulk mass of base 4. Said warming reduces distortion and shrinkage of the cap associated with the cooling of the molten metal material.

In the illustrated embodiment the lip 70 projects by around 3 mm (upwardly) from the cap-facing side 68. The lip 70 preferably projects by between around 1 mm and around 5 mm. In the illustrated embodiment the lip 70 is around 3 mm in thickness when viewed in plan (i.e. in width or depth). The lip 70 is preferably between around 1 mm and around 5 mm in thickness when viewed in plan.

As will be appreciated from FIG. 3, the recesses 58, 60, 64 (and 62, not visible in FIG. 3) extend through at least the cap-facing side 68 of the base 4. Furthermore, each of the recesses 58, 60, 64 comprises filleted edges where said recesses 58, 60, 64 open out into the cap-facing side 68. As will be appreciated from FIG. 4, a corresponding filleted edge is provided around the recesses 58, 60, 64 where they open out into the cavity 48 of the opposing side.

Returning to FIG. 3, the base 4 further comprises an attachment portion 72. The attachment portion 72 extends from a cap-facing side 68. The attachment portion 72 defines an uppermost point of the base 4 at an outer tip 74 of the attachment portion 72. Attachment portion 72 facilitates attachment of the cap to the base 4. The attachment portion 72 is generally cuboidal and maybe described as tab-shaped.

The attachment portion 72 defines a retention feature in the form of an aperture 76. The aperture 76 is a feature which molten metal material, of the cap, flows through when the cap is cast onto the base 4. The features interlock to secure the cap to the base 4 (as shown in, for example, FIGS. 11 and 12).

In the illustrated embodiment, the aperture 76 is a generally arcuate aperture. Generally arcuate aperture is intended to mean that less than around 30%, preferably less than around 25% or 20%, of a perimeter of the aperture 76 is defined by linear edges. Instead, the majority of the perimeter of the aperture 76 is defined by arcuate edges.

Advantageously, incorporating a generally arcuate aperture 76 reduces any comparatively sharp fillets which could otherwise lead to cracks propagating in the attachment portion 72 as part of the manufacturing (casting) process.

Provided between the aperture 76 and the cap-facing side 68 is a land 78 of material. The land of material 78 refers to a solid block of material. Advantageously, the presence of the land 78 of material provides structural reinforcement, and robustness, to the base 4 despite the incorporation of the aperture 76. The aperture 76 may be said to be offset from the cap-facing side 68 by the land 78 of material.

Four buttresses 80, 82, 86 (84 not visible in FIG. 3) extend between the attachment portion 72 and the cap-facing side 68. The buttresses 80, 82, 86 are supporting projections of sorts which extend in a generally diagonal direction when viewed in plan (see, for example, FIG. 5). The buttresses 80, 82, 86 are generally triangular projections. Advantageously, the presence of the buttresses 80, 82, 86 reduces the risk of distortion occurring to the attachment portion 72, particularly between the attachment portion 72 and the cap-facing side 68. This is of particular importance where the attachment portion 72 is used to secure the cap to the base 64. The presence of the buttresses 80, 82, 86 also reduces the risk of torsional distortion, or twisting, of the attachment portion 72 about the cap-facing side 68.

As will be appreciated from FIG. 3, each of the buttresses 80, 82, 86 extends between a respective two recesses 58, 60, 64. Again, this is more clearly visible in FIG. 5.

Figure 4:
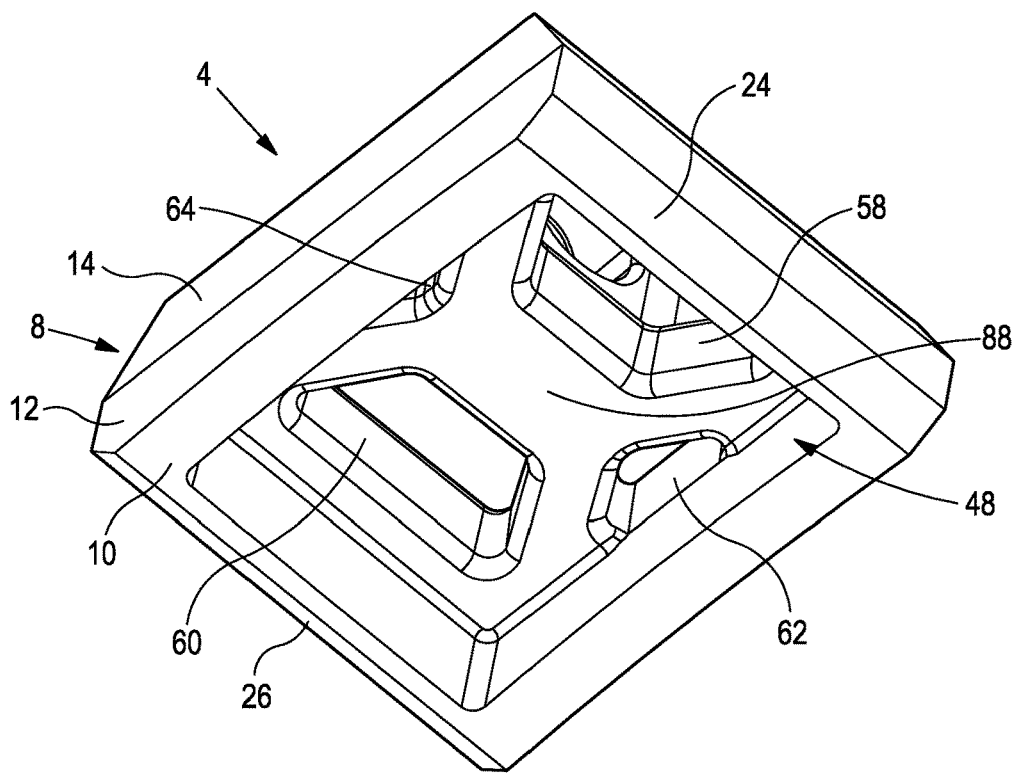
FIG. 4 is a perspective view of the base of FIG. 3, shown generally from below.

Turning to FIG. 4, a perspective view of the base 4 is provided shown generally from the underside. FIG. 4 thus shows the cavity 48 defined in the underside 10 of the base 4.

FIG. 4 shows how the recesses 58, 60, 62, 64 open out into the cavity 48. Put another way, the recesses 58, 60, 62, 64 extend to the recess 48. When FIG. 4 is viewed in combination with FIG. 3 it will be appreciated that each of the recesses 58, 60, 62, 64 extends between the cap-facing side 68 and the recess 48. FIG. 4 also illustrates how lower ends of the recesses 58, 60, 62, 64 have filleted edges like that described in connection with the upper edges in connection with FIG. 3.

FIG. 4 also shows a generally X-shaped geometry which defines an uppermost point of the recess 48. Said X-shaped geometry is defined at least partly by a surface 88 provided between the cavity 48 and the aperture 76 (in the attachment portion 72). The recess 48 may therefore be said to extend between the surface 88 and the underside 10. The surface 88 defines an uppermost point of the cavity 48.

For completeness, FIG. 4 also shows the first and second portions 12, 14 of the body 8 of the base 4. Chamfers 24, 26 defined in the front and rear edges of the first portion 12 are also visible in FIG. 4.

Turning to FIG. 5, a plan view of the base 4 is provided. In FIG. 5, generally only a second portion 14 of the body 8 is visible, along with the attachment portion 72 and buttresses 80, 82, 84, 86.

FIG. 5 more clearly shows the arrangement of the four recesses 58, 60, 62, 64 extending between the cap-facing side 68 and the recess (provided beneath the indicated recesses in FIG. 5). Each of the recesses 58, 60, 62, 64 are generally trapezoidal in that they have one pair of parallel sides. The shapes of the recesses 58, 60, 62, 64 may otherwise be described as dovetail-like or tapering. Third and fourth recesses 62, 64 are smaller in cross-section than the first and second recesses 58, 60.

The recesses can be grouped into two pairs of recesses 58, 60 and 62, 64. Recesses belonging to a given pair may each be said to generally oppose one another in that they mirror each other across a central plane of the base 4. Two such planes are indicated schematically in FIG. 5 as 90, 92.

Taking a first plane 90, the plane 90 bisects the base 4 between front and rear sides thereof. The first plane 90 may therefore be said to define a mid-point of a depth of the tooth. First and second recesses 58, 60 are provided equidistant from, and opposing one another about, the first plane 90.

Turning to the second plane 92, the second plane 92 bisects the base 4 between left and right sides thereof. The second plane 92 may therefore be said to define a mid-point of a width of the base 4. Third and fourth recesses 62, 64 are provided equidistant from, and oppose one another about, the second plane 92.

It will also be appreciated that the base 4 has two planes of symmetry about both the first and second planes 90, 92. More uniform cooling, and being able to insert the base 4 into the mould in multiple orientations, are benefits stemming from the symmetry of the base 4. The symmetry also provides the possibility of being able to rotate the cap, relative to the base 4, when the tooth is manufactured, to provide a 'lateral' tooth.

FIG. 5 illustrates each of the buttresses 80, 82, 84, 86 extending between the attachment portion 72 and the cap-facing side 68. Each of the buttresses 80, 82, 84, 86 generally extends from a corner of the cuboidal attachment portion 72 when viewed from above. Each of the buttresses 80, 82, 84, 86 also extends in a direction between a respective two recesses 58, 60, 62, 64. For example, the first buttress 80 extends between the first recess 58 and fourth recess 64. The buttresses 80, 82, 84, 86 extend generally diagonally across the cap-facing surface 68.

The base 4 has an aspect ratio (i.e. a ratio of width to depth) of around 0.8 when viewed in plan The base 4 preferably has an aspect ratio of between around 0.6 and around 1 when viewed in plan. Put another way, the base 4 is preferably generally square.

Turning to FIG. 6, a view of the base 4 from underneath is provided. FIG. 6 shows the underside 10 generally defined by the peripheral edge 66 which extends around the cavity 48. The cavity 48 can therefore be said to be defined by the peripheral edge 66 and/or the underside 10.

FIG. 6 shows the layout of the recesses 58, 60, 62, 64 from underneath. The recesses 58, 60, 62, 64 may be collectively referred to as an array, or arrangement, of recesses. The generally X-shaped surface 88, which defines an upper limit of the recess 48, is also shown. Chamfers 24, 26 are also visible in FIG. 6.

Figure 7:
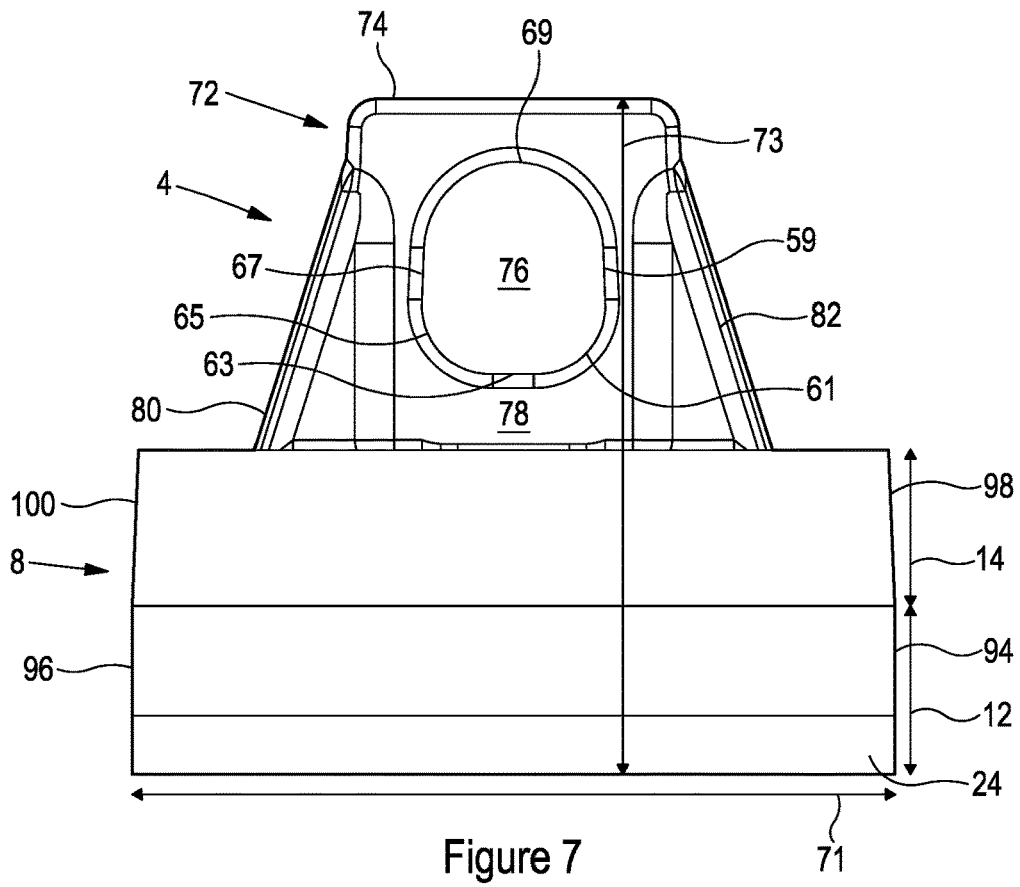
FIG. 7 is a front view of the base shown in FIGS. 3 to 6.

FIG. 7 is a front view of the base 4.

A vertical extent of the first and second portions 12, 14 of the body 8 of the base 4 are indicated in FIG. 7. Chamfer 24 is also visible.

The attachment portion 72 is shown projecting from the body 8 (specifically a cap-facing side thereof, not visible in FIG. 7). Similarly, first and second buttresses 80, 82 are shown extending between the attachment portion 72 and the body 8. The generally arcuate aperture 76, extending entirely through the attachment portion 72, can also be seen. The land 78 of material provided underneath the aperture 76, between the aperture 76 and the body 8, is also visible. As previously mentioned, the outer tip 74 of the attachment portion 72 defines the tallest or uppermost point of the base 4.

As mentioned above, generally arcuate aperture is intended to mean that less than around 30%, preferably less than around 25% or 20%, of a perimeter of the aperture 76 is defined by linear edges. Instead, the majority of the perimeter of the aperture 76 is defined by arcuate edges. In the illustrated embodiment, the aperture 76 has a perimeter defined by three linear edges 59, 63, 67 and three arcuate edges 61, 63, 69. The linear edges 59, 63, 67 interpose the arcuate edges 61, 63, 69. The total perimeter of the aperture 76 is around 140 mm in the illustrated embodiment. The sum of the extent of the linear edges 59, 63, 67 is around 30 mm. The extent of the perimeter which is linear is therefore only around 20% (~21%). The majority of the perimeter of the aperture 76 is defined by arcuate edges. Also of note, a single arcuate edge 69 extends between two generally parallel linear edges 59, 63. Put another way, the arcuate edge 69 is generally U-shaped. No linear edges are provided between outer ends of the arcuate edge 69.

The aperture 76 is around 40 mm wide in the illustrated embodiment (i.e. the distance between the linear edges 59, 67). The aperture 76 is preferably between around 20 mm and around 60 mm wide. The aperture 76 is around 45 mm in height in the illustrated embodiment. The aperture is preferably between around 30 mm and around 60 mm in height. The radius of the arcuate edges 61, 63 is around 15 mm in the illustrated embodiment, and is preferably between around 10 mm and around 20 mm. The radius of the arcuate edge 69 is around 20 mm in the illustrated embodiment, and is preferably between around 10 mm and around 30 mm.

Incorporation of a generally arcuate aperture reduces the risk of stress-induced cracks being formed at otherwise comparatively sharp corners of the aperture. This concept can be utilised in isolation or, or in combination with, the incorporation of the cavity (48 in FIG. 4) in the base 4.

Returning to FIG. 7, a width 71 of the base 4 is around 160 mm in the illustrated embodiment. The width 71 is preferably between around 90 mm and around 200 mm. Given that the base 4 defines the widest part of the overall tooth in the illustrated embodiment, the aforementioned width dimensions also apply to the tooth more generally (i.e. the width of the tooth is around 160 mm in the illustrated embodiment). The base 4 having widths falling within the aforementioned ranges have been found to be advantageously compatible with machinery associated with compactor vehicles. An example of such machinery is a scraper used to remove debris from the wheel, between teeth mounted to the wheel.

A height 73 of the base 4 is around 140 mm in the illustrated embodiment. The height 73 is preferably between around 50 mm and around 200 mm.

As shown in FIG. 7, the outer sides 94, 96 of the first portion 12 are generally planar and extend in a vertical direction. Outer sides 98, 100 of the second portion 14 are also planar but incorporate a shallow draft, of around 2.5°, away from the vertical. A vertical height of the first portion 12 is around 35 mm in the illustrated embodiment. The vertical height of the first portion 12 is preferably between around 30 mm and around 45 mm. A vertical height of the second portion 14 is also around 35 mm in the illustrated embodiment. The vertical height of the second portion 14 is preferably between around 30 mm and around 45 mm. The combined heights of the first and second portions 12, 14, and so an overall height of the body 8, is therefore around 70 mm in the illustrated embodiment. The combined heights of the first and second portions 12, 14, and so an overall height of the body 8, is preferably between around 60 mm and around 90 mm. However, it will be appreciated that a range of other dimensions, and geometries, may otherwise be used.

As mentioned above, one distinction of the illustrated tooth 2, in comparison to existing teeth, is the presence of the second portion 14 of the body 8 of the base 4. Advantageously, increasing the height of the body 8 of the base 4, by incorporating the second portion 14, avoids using the (comparatively expensive) second molten metal material, used to manufacture the cap, in regions which generally experience low wear in use. It has been found that below around 70 mm, of an overall height of the tooth 2, the wear is considerably lower than in the region above it. The illustrated tooth 2 therefore provides a desirable balance of cost saving and durability by increasing the height of the body 8 of the base 4.

Figure 8:
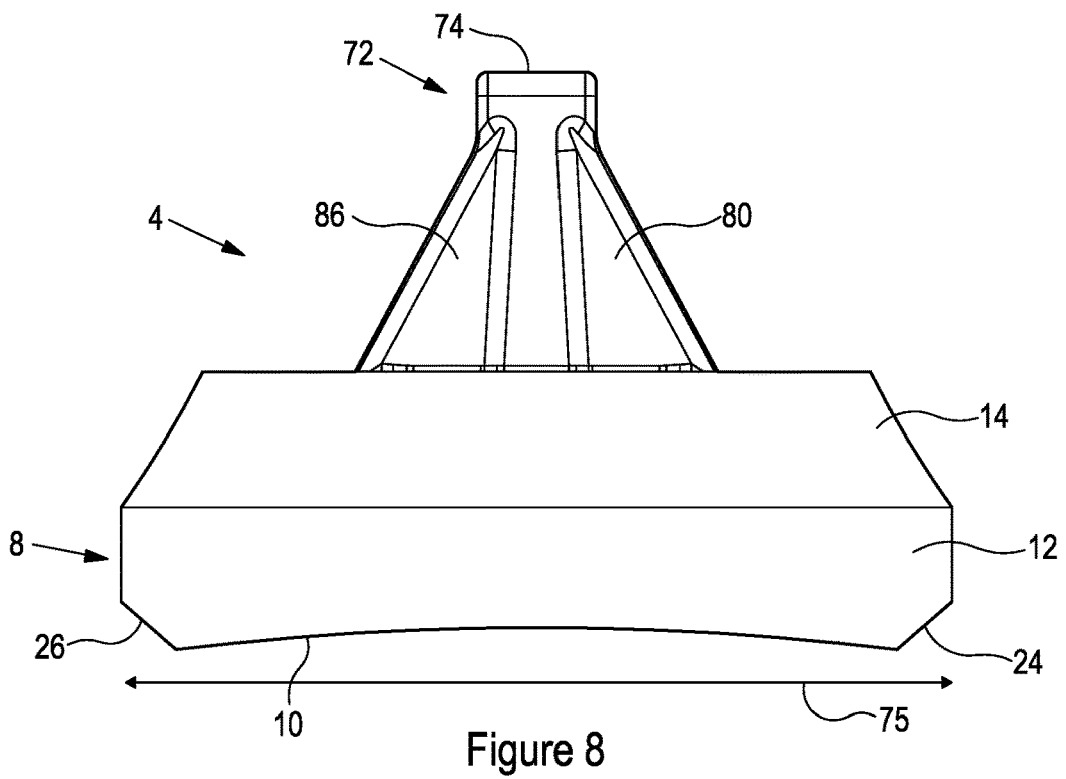
FIG. 8 is a side view of the base shown in FIGS. 3 to 7.

FIG. 8 is a side view of the base 4.

FIG. 8 shows the arcuate nature of the underside 10, or specifically a portion thereof. The underside 10 being at least partly arcuate is advantageous in providing a more secure engagement of the base 4, and so the overall tooth, to a wheel of the compactor vehicle. An at least partly arcuate underside 10 therefore provides an improved conformance of the underside 10 of the base 4 to the wheel of the compactor vehicle. In the illustrated embodiment, the radius of curvature of the underside 10 is around 750 mm. However, and as mentioned above, other dimensions may otherwise be used.

FIG. 8 also shows first and fourth buttresses 80, 86 extending from the attachment portion 72 to the body 8 to the base 4. Like in FIG. 7, the outer tip 74 of the attachment portion defines an uppermost point, or outer tip 74, of the base 4.

A depth 75 of the base 4 is around 200 mm in the illustrated embodiment. The depth 75 is preferably between around 100 mm and around 300 mm. Given that the base 4 defines the deepest part of the overall tooth in the illustrated embodiment, the aforementioned depth dimensions also apply to the tooth more generally (i.e. the depth of the tooth is around 160 mm in the illustrated embodiment).

Turning to FIG. 9, a cross-section front view of the base 4 is provided as indicated by the cross-section marker 91 shown in FIG. 5. Returning to FIG. 9, the cross-section front view indicates the relative depths of various internal features of the base 4 previously introduced in this document.

FIG. 9 shows the body 8 of the base 4 comprising the first and second portions 12, 14. Attachment portion 72 is shown extending from the cap-facing side 68, the attachment portion 72 defining the generally arcuate aperture 76 therethrough. Third and fourth buttresses 84, 86 extend between the attachment portion 72 and the cap-facing side 68. The lip 70 extends around a periphery of the cap-facing side 68. The land 68 of material provided between the cap-facing side 68 and the aperture 76 is also indicated, along with the vertical height of the same.

Third and fourth recesses 62, 64, which extend between the cap-facing side 68 and the cavity 48, are also shown. A vertical height, depth or extent, of the third and fourth recesses 62, 64 is labelled 104 in FIG. 9. The vertical height 104 of the third and fourth recesses 62, 64 is substantially the same as the vertical height of the recesses 58, 60 (not shown in FIG. 9). As previously mentioned, a height, or depth, of the recesses is defined between the cap-facing side 68 and the surface 88. The recesses 62, 64 open out into the cavity 48. A vertical extent of the cavity 48 is also labelled in FIG. 9. For completeness, an indicated plane 102 corresponds with the surface 88, which defines an end point of both the cavity 48 and the recesses 62, 64.

FIG. 9 also indicates the undercut nature of the recesses 62, 64. Described only in connection with the fourth recess 64, but equally applicable to the third recess 62 (and first and second recesses 58, 60), the fourth recess 64 has a narrowest width 106 and a width 108 at a lowermost point of the recess 64. It will be appreciated that along the depth of the recess 64, moving from the narrowest point 106 towards the lowermost end width 108, the recess 64 generally increases in width. This may otherwise be described as the generally undercut feature. This is particularly evident at the width 108 defined at the lowermost point of the recess 64. When molten metal material of the cap is poured onto the cap-facing side 68 of the base 4, as part of the manufacturing process, the second molten metal material runs along the cap-facing side 68 and down into the recesses 62, 64. The second molten metal material is substantially prevented from entering the cavity 48 and its flow is therefore limited to approximately the plane indicated by 102 in FIG. 9 (i.e. in line with the surface 88). The second molten metal material, which goes on to form the cap, therefore only extends down to a lowermost point of the recesses 62, 64, as indicated by a lowermost point of the height indicator 104. The second molten metal material therefore entirely fills the recesses 62, 64, including at both narrowest, and end, points 106, 108.

Once the second molten metal material solidifies, the outwardly tapering, or undercut, nature of the recesses 62, 64, in combination with the solidified cap material (e.g. projections), interlock the base 4 with the cap. Put another way, the cap is anchored to the base 4. Each of the cap and base 4, specifically projections (not shown in FIG. 9) and the recesses 62, 64 thereof, thus define retention features which secure the base to the cap.

As will be appreciated from FIGS. 11 and 12, and as will be described later in the document, it is a combination of the recesses 62, 64 (and 58, 60, not shown in FIG. 9) and the aperture 76, these being the retention features of the base 4, which receive molten metal material of the cap and interlock the cap to the base 4.

In some embodiments, the attachment portion 72, and so aperture 76, may be omitted. However, the recesses 62, 64 (and 58, 60, not shown in FIG. 9) still define retention features which, after the cap has been cast onto the base 4, interlock the cap with the base 4. Any attempt at separating the cap from the base is substantially prevented by the interference of cap material with the narrowing recesses 62, 64. It will be appreciated that once the second molten metal material is poured onto the cap-facing side 68, and flows into the recesses 62, 64, the resulting cap material generally conforms, or corresponds to, the geometry of the recesses 62, 64 (and 58, 60, not shown in FIG. 9). This is owing to the fact that the base 4 forms at least part of a mould used to cast the cap, and so overall tooth.

FIG. 9 also illustrates how the cavity 48 extends through a majority of the first portion 12 of the base 4. As will be appreciated from the plane 102, corresponding to the surface 88 and so an uppermost point of the cavity 48, the plane 102 lies at a lower position than a lowermost point of the second portion 14. As such, the illustrated cavity 48 does not extend through an entirety of the first portion 12, but in some embodiments the cavity may extend through an entirety of the first portion 12. Similarly, in some embodiments the cavity may extend through an entirety of the first portion 12, and at least part of the second portion 14.

Turning to FIG. 10, a cross-section side view of the base 4 is provided as indicated by the cross-section marking labelled 93 in FIG. 5.

Many features of FIG. 10 have already been described in detail in connection with FIG. 9. FIG. 10 more clearly shows the arcuate nature of at least part of the underside 10 of the base 4.

The attachment portion 72 is again shown extending from the cap-facing side 68, and defining the generally arcuate aperture 76 therethrough. The land of material 78 provided between the cap-facing side 68 and the aperture 76 is also labelled. The lip 70 extends around the periphery of the cap-facing side 68.

The land of material 78 is around 20 mm in height in the illustrated embodiment, and is preferably between around 10 mm and 30 mm.

First and second recesses 58, 60 are visible in FIG. 10. Like the third and fourth recesses 62, 64 described in connection with FIG. 9, the first and second recesses 58, 60 generally increase in cross-section moving from an uppermost point of the recesses towards a lowermost point of the recesses. As such, and again like the recesses 62, 64 described in connection with FIG. 9, the recesses 58, 60 are generally undercut in that their cross-section towards a lowermost point of the recesses is greater than a cross-section at an uppermost point. When a molten metal material of the cap is cast into the recesses 58, 60, and the material solidifies, each of the recesses 58, 60 and corresponding projections of the cap (not shown in FIG. 10), define retention features which interlock with one another to secure the cap to the base 4.

FIG. 11 is a front cross-section view of the tooth 2 taken about a cross-section line as indicated by the cross-section markers 110 in FIG. 1.

As will be appreciated from FIG. 11, the tooth 2 is shown in an assembled state and with both the base 4 and the cap 6 present. Retention features of the base 4 and the cap 6, as will be described in detail below, interlock with one another to interlock the base 4 to the cap 6.

In FIG. 11 it will be appreciated that the outer surface 28 of the cap 6 forms a generally continuous exterior with an outer surface of the base 4. Specifically, flat faces 30, 32 of the cap 6 are generally flush with outer surfaces 98, 100 of the second portion 14 of the base 4. These surfaces meet at join lines 18, 22.

FIG. 11 indicates how the molten metal material used to cast the cap 6 generally flows over the cap-facing side 68 of the base 4. Furthermore, the molten metal material flows into the third and fourth recesses 62, 64 (and first and second recesses—not shown in FIG. 11).

Figure 13:
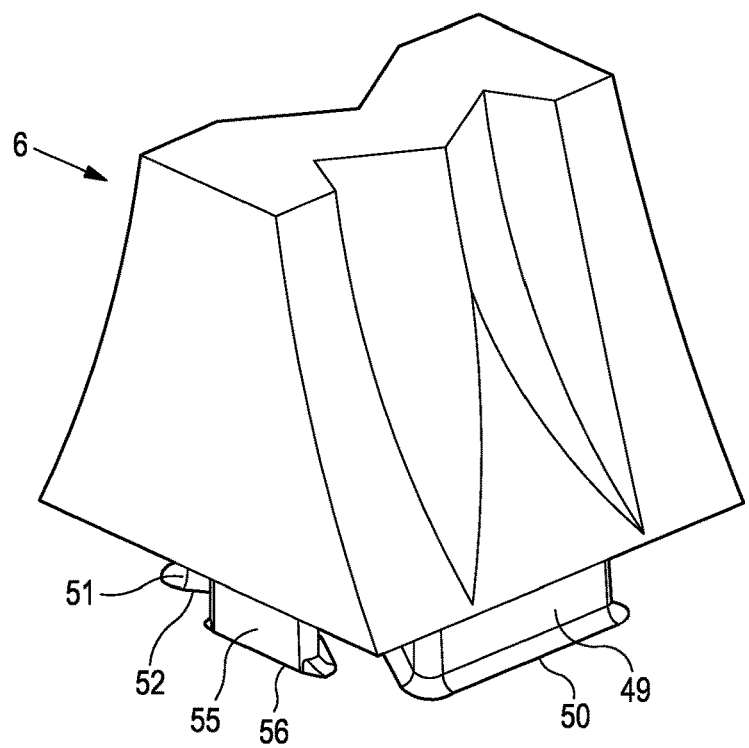
FIG. 13 is a perspective view of a cap of the tooth shown in FIGS. 1 and 2, shown generally from above.
Figure 14:
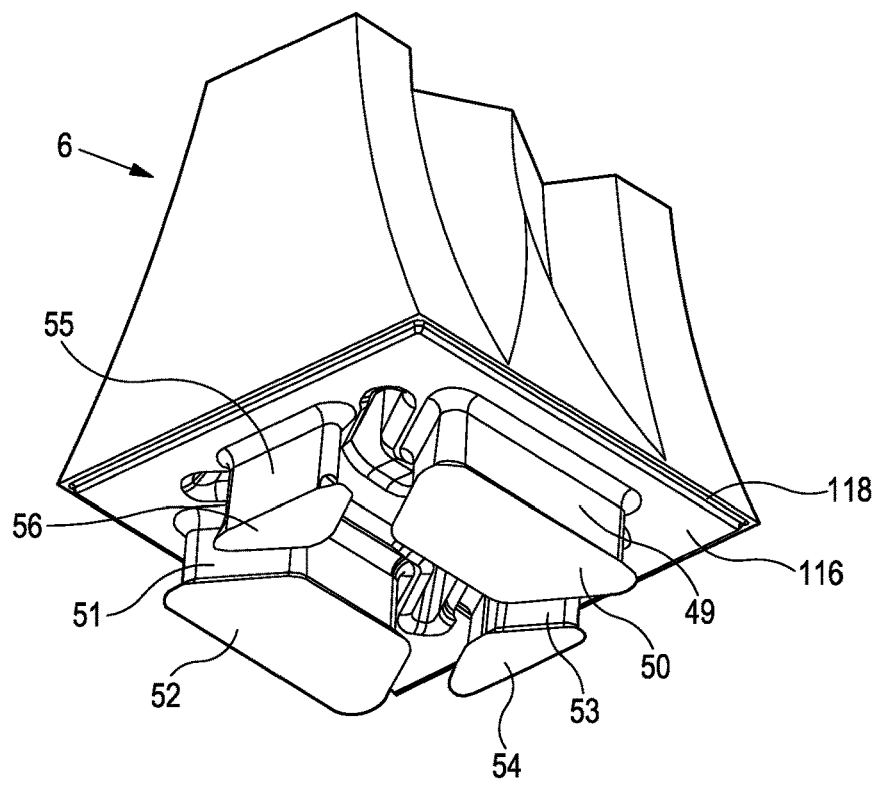
FIG. 14 is a perspective view of the cap of FIG. 13 shown generally from below.

By virtue of the molten metal material, used to cast the cap 6, flowing into the recesses 62, 64 (among others), a plurality of projections 53, 55 (49, 51 not visible in FIG. 11) are defined in the cap 6. The projections 49, 51, 53, 55 are also shown in FIGS. 13 and 14, whereat the cap 6 is shown in isolation of the base 4.

Returning to FIG. 11, third and fourth projections 53, 55 extend through third and fourth recesses 62, 64. As such, the volumes, e.g. geometries, of the third and fourth projections 53, 55 generally match those of the third and fourth recesses 62, 64. This is to be expected given that the recesses 62, 64 effectively form part of the mould used to cast the cap 6. FIG. 11 illustrates how the outer ends 54, 56 of the third and fourth projections 53, 55 splay outwardly relative to a body of the projections 53, 55. Put another way, the projections 53, 55 extend outwardly at outer ends 54, 56 thereof. This provides an anchoring functionality in that the projected cap 6 is thus securely interlocked with, and secured to, the base 4.

The outer ends 54, 56 of the projections 53, 55 are generally flush with the surface 88 which also defines the uppermost surface of the cavity 48. As such, the molten metal material used to cast the cap 6 only extends down to the point where the outer ends 54, 56 of the projections 53, 55 are defined. Substantially no molten metal material, used to manufacture the cap 6, thus enters the cavity 48. This effect may be achieved by sealing, or blocking, the cavity 48 whilst the molten metal material, used to manufacture the cap 6, is poured. A blocking element may be used as a way of preventing the molten metal material flowing into the cavity 48. The blocking element may also advantageously define a lowermost surface of the recesses 62, 64 during the moulding process.

FIG. 11 also indicates that a portion 114 of molten metal material of the cap 6 flows through the aperture 76 of the base 4. Once the molten metal material of the cap 6 solidifies, the portion 114 and the aperture 76 thus define retention features which interlock with one another to also secure the cap 6 to the base 4. It will be appreciated from FIG. 11 that the attachment portion 72 is generally obscured from view once the cap 6 has been cast onto the base 4.

A height 77 of the tooth 2 is around 200 mm (e.g. 205 mm) in the illustrated embodiment. The height 77 is preferably between around 90 mm and around 300 mm.

Turning to FIG. 12, a cross-section side view of the tooth 2 is provided as indicated by the cross-section markings labelled 112 in FIG. 1.

FIG. 12 shows the portion 114 of material of the cap 6 which extends through the aperture 76. Of note, because of the cross-section view provided, the attachment portion 72 appears disjointed owing to the presence of the aperture 76. The land 78 of material between the aperture 76 and the cap-facing side 68 is also more clearly visible in FIG. 12.

FIG. 12 shows first and second recesses 58, 60 defined in the base 4. First and second projections 49, 51 of the cap 6 extend through the first and second recesses 58, 60 respectively. Like that described in connection with FIG. 11, outer ends 50, 52 of the first and second projections 49, 51 lie substantially flush with surface 88, or an uppermost surface of the cavity 48. Furthermore, the recesses 58, 60 generally taper outwards moving from the cap-facing side 68 towards the cavity 48. Similarly, the projections 49, 51 therefore also generally taper outwardly moving from the cap-facing side 58 towards the cavity 48. The recesses 58, 60, and projections 49, 51, thus again define retention features which interlock with one another and interlock the cap 6 to the base 4.

For completeness, the outer surface 28 of the cap 6 meets the second portion 14 of the base 4 at join lines 16, 20.

FIG. 13 is a perspective view of the cap 6, generally from above, in isolation of the base. It will be appreciated that, in practice, it is generally not possible to obtain the geometry of the cap 6 shown in FIG. 13, in isolation of the base, without destroying the base 4 from around the cap 6.

FIG. 13 shows the first projection 49, second projection 51, and fourth projection 55 of the cap 6. As will be appreciated from FIG. 13, the projections 49, 51, 55 generally extend downwardly from the cap 6. Outer ends 50, 52, 56 of projections 49, 51, 55 are shown to generally extend outwardly towards the lowermost position of the projections. The extension, or outwardly splaying, nature of the projections outer ends 50, 52, 56 also provides an anchoring effect and secures the cap 6 to the base. Each of the projections 49, 51, 55 (and 53, not visible in FIG. 13) thus define retention features which secure the cap 6 to the base 4.

Turning to FIG. 14, an perspective view of the cap 6 is provided generally from beneath. FIG. 14 clearly shows each of first to fourth projections 49, 51, 53, 55, and associated outer ends 50, 52, 54, 56 thereof. Like that described above in connection with FIG. 13, the outer ends 50, 52, 54, 56 of each of the projections 49, 51, 53, 55 generally extend outwardly towards the lowermost point of the projections 49, 51, 53, 55. In the illustrated embodiment the outer ends 50, 52, 54, 56 of each of the projections 49, 51, 53, 55 extend around 30 mm (downwardly) from the cap-facing side 116. The projections preferably extend by between around 20 mm and around 50 mm from the cap-facing side. As will be appreciated from FIG. 14, the array of projections 49, 51, 53, 55 generally matches the array of recesses (see FIG. 5) 58, 60, 62, 64. The respective arrays generally correspond with one another and define retention features which interlock with one another to secure the cap 6 to the base.

For completeness, FIG. 14 also shows a base-facing surface 116 of the cap 6. A recess 118 extends around a peripheral edge of the base-facing surface 116 and is created by virtue of the lip 70 (see FIG. 3).

Figure 15:
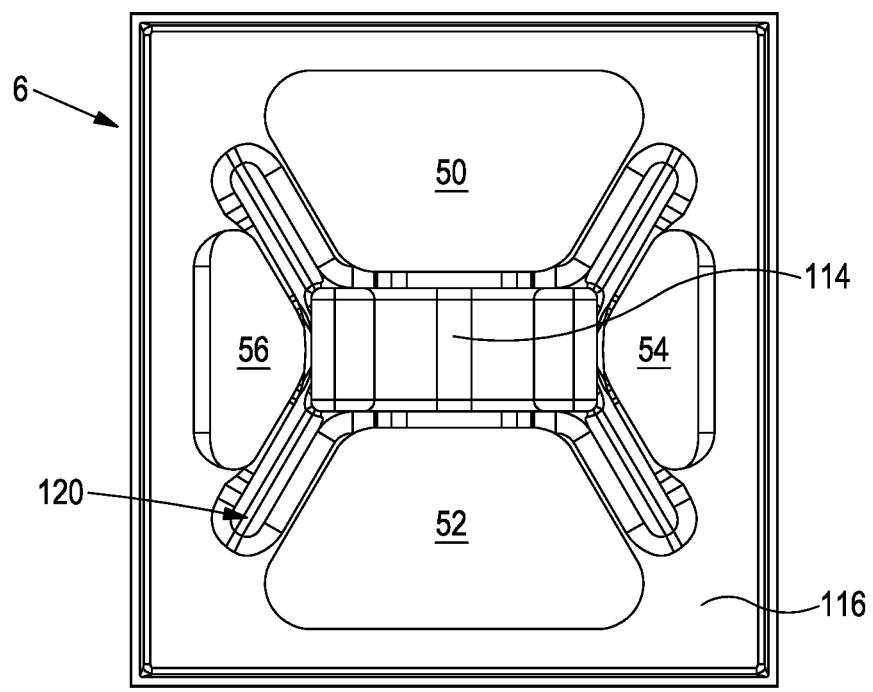
FIG. 15 is a view of the underside of the cap shown in FIGS. 13 and 14.

FIG. 15 shows the underside of the cap 6 in isolation of the base. The view is taken normal to the base-facing side 116. Outer ends 50, 52, 54, 56 of each of the projections 49, 51, 53, 55 (not labelled in FIG. 15) are shown in FIG. 15, along with part of a recess 120 which corresponds to the shape of the attachment portion and buttresses of the base (e.g. see FIGS. 3 and 5). The portion 114 of material which extends through the aperture of the attachment portion, to define a retention feature, is also shown in FIG. 15.

Figure 16:
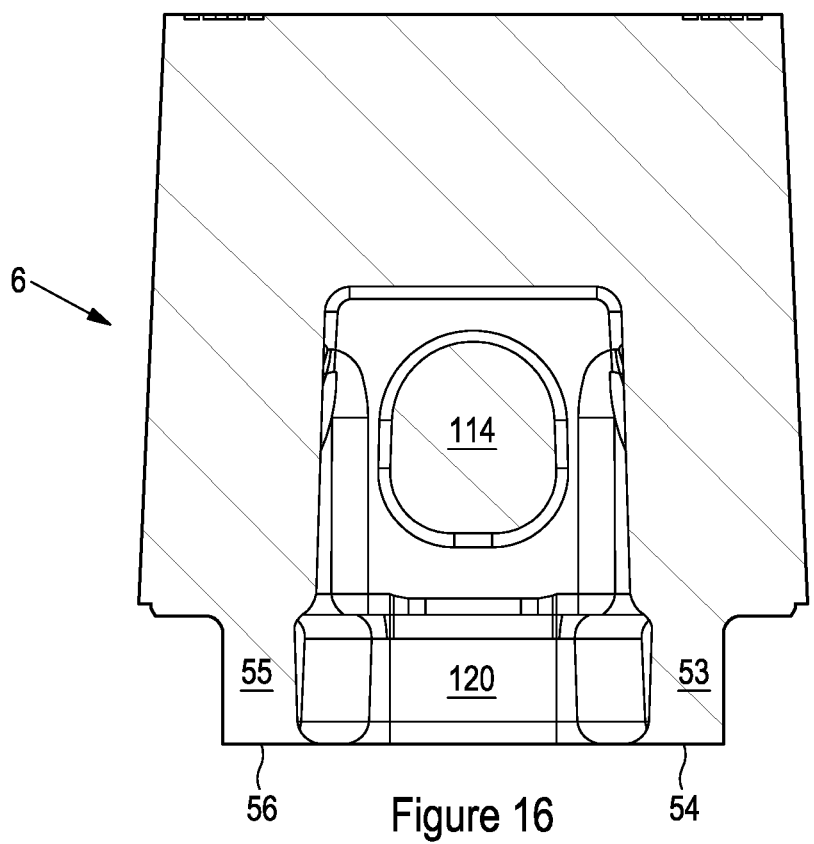
FIG. 16 is a cross-section front view of the cap shown in FIGS. 13 to 15.

FIG. 16 is a cross-section front view of the cap 6 in isolation. The FIG. 16 view corresponds with that shown in FIG. 11, but with the base 4 omitted.

FIG. 16 shows the third and fourth projections 53, 55 of the cap 6, along with outer ends 54, 56 thereof. Part of the recess 120, corresponding with the attachment portion and buttresses of the base, is also visible. Finally, the portion of material 114 which extends through the aperture of the base is also shown.

Figure 17:
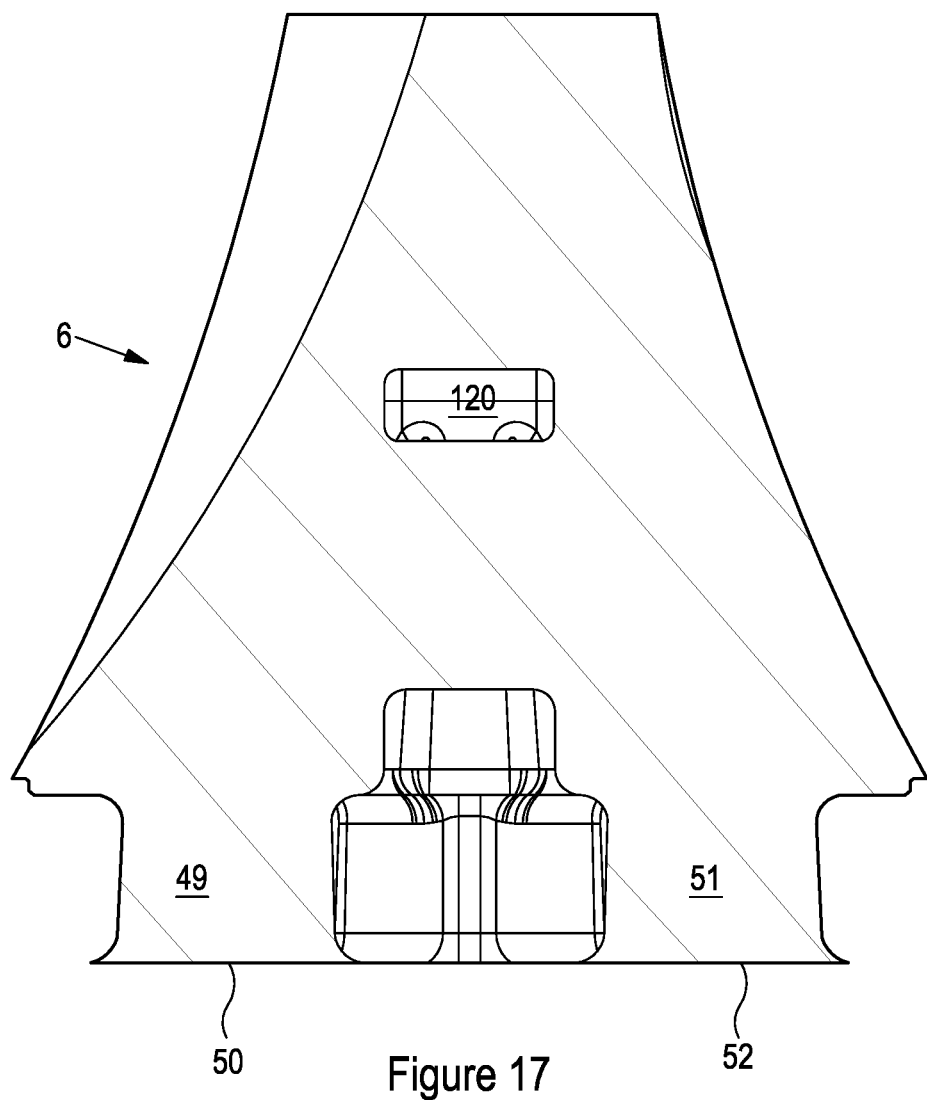
FIG. 17 is a cross-section side view of the cap shown in FIGS. 13 to 16.

FIG. 17 is a cross-section side view of the cap 6 in isolation of the base. The FIG. 17 view generally corresponds with that shown in FIG. 12, but with the base 4 omitted.

First and second projections 49, 51 of cap 6 are visible, along with outer ends 50, 52 thereof. Part of the recess 120, generally corresponding with the attachment portion and buttresses of the base, is also visible.

Turning to FIG. 18, a tooth 200 according to another embodiment is illustrated. FIG. 18 is a perspective view of the tooth 200 generally from above.

The tooth 200 comprises the base 4 and a cap 202. The base 4 is identical to the base 4 described in connection with earlier figures, and will therefore not be described in detail here.

The cap 202 is different, in some aspects, to the cap 6 described previously. An outer tip 204 of the cap 202 is generally dumbbell-shaped. The cap 202 generally has two planes of symmetry.

The cap 202 comprises flat surfaces (e.g. 206), arcuate surfaces (e.g. 208) and a plurality of generally arcuate recesses (210, 212).

As indicated by comparing FIGS. 1 and 18, the same base 4 can be used to manufacture teeth having different cap geometries for different purposes. The way in which the cap 202 is manufactured, and attached to the base 4, is the same as that described in connection with the earlier embodiment.

FIG. 19 shows a perspective view of the tooth 200 generally from below. As mentioned above, the tooth 200 comprises the base 4 and the cap 202.

Figure 20:
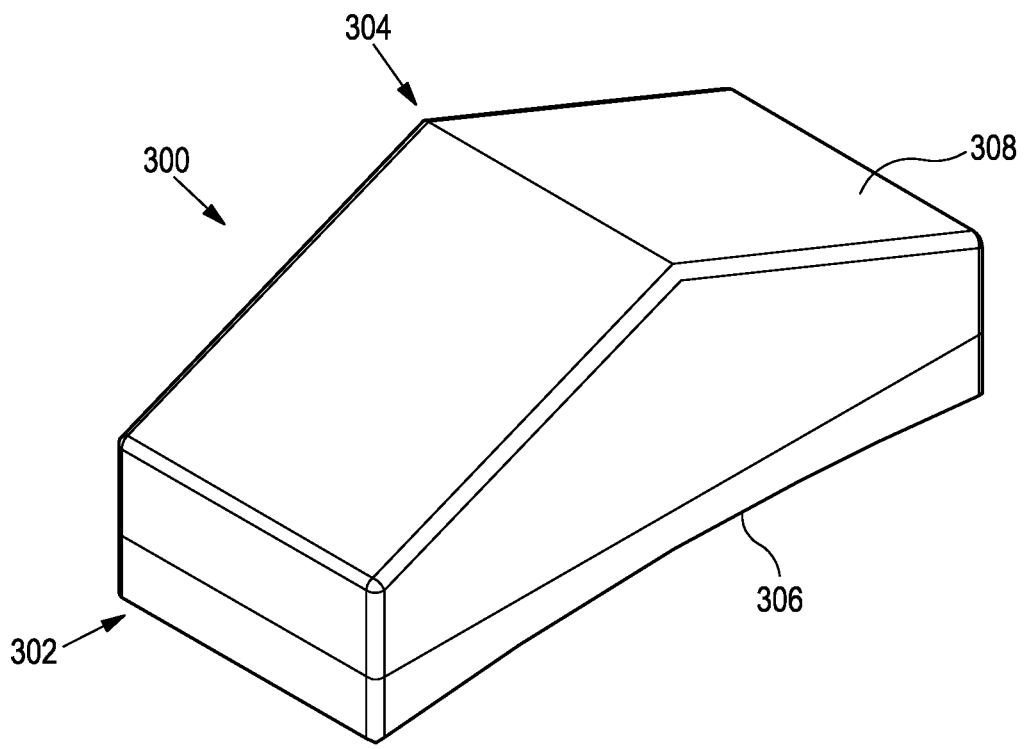
FIG. 20 is a perspective view of a guard according to another embodiment.

FIG. 20 is a perspective view of a guard 300 according to another embodiment. The guard 300 incorporates a number of features described in connection with the tooth 2, and so the guard 300 will only be described briefly.

The guard 300 is a component which protects the compactor vehicle from debris. The guard may protect the compactor vehicle by reducing the risk that debris, such as wire and/or strapping, become entangled around, and damage, a main shaft seal provided around an axle which the wheel is mounted to.

Figure 22:
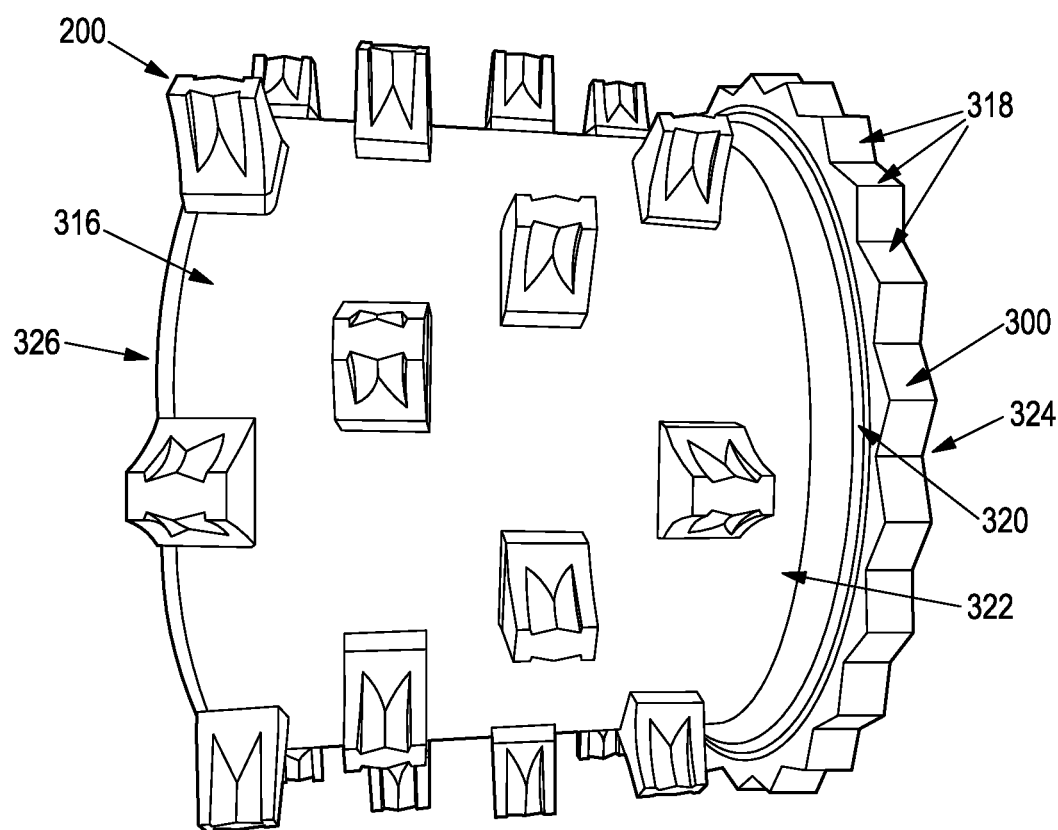
FIG. 22 is a perspective view of a compactor vehicle wheel with a plurality of teeth and guards mounted thereto.

In preferred embodiments, a circumferential array of multiple guards 300 is provided around the wheel of a landfill compactor vehicle (e.g. as shown in FIG. 22).

Returning to FIG. 20, the guard 300 comprises a base 302 and a cap 304. Like the earlier embodiments, the cap 304 is preferably cast onto the base 302, the overall guard 300 being manufactured using a twin-shot casting process.

The base 302, specifically an underside 306 thereof, is configured to engage a wheel of a compactor vehicle. Although not visible in FIG. 20, the underside 306 comprises a cavity similar to the cavity 48 described in connection with the base 4.

The cap 304 defines an outer surface 308. Although not visible, the cap 304 comprises one or more retention features which interlock with corresponding retention features in the base 302 to secure the cap 304 to the base 302.

Figure 21:
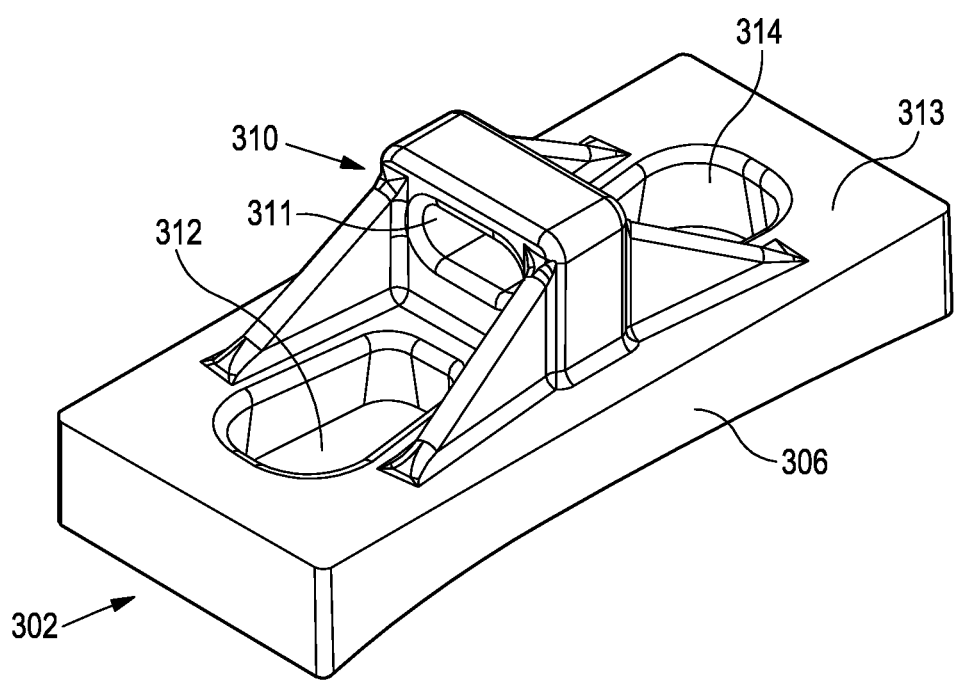
FIG. 21 is a perspective view of the base of the guard of FIG. 20 in isolation.

FIG. 21 is a perspective view of the base 302 in isolation. From FIG. 21 the similarities between the base 302 and the base 4 (see FIG. 3) will be appreciated. The base 302 comprises an attachment portion 310, recesses 312, 314 and a number of other features like that of the base 4 shown in FIG. 3. The base 302 comprises a plurality of retention features (e.g. an aperture 311 of the attachment portion 310, and recesses 312, 314). The base 302 comprises a cap-facing side 313.

Owing to the similarities between the base 302 and the base 4, it will be appreciated that incorporation of the cavity in the underside 306 of the base 302 (not visible in FIG. 21) is beneficial for the same reasons described in connection with the base 4. Examples of advantages include weight and cost savings, reduced process requirement, easier welding of the base to the wheel, and reduced thermal inertia of the base.

FIG. 22 is a perspective view of a compactor vehicle wheel 316 with a plurality of teeth 200 and guards 300 mounted thereto.

A circumferential array 318 of guards 300 (only one of which is labelled) is incorporated. Each of the guards 300 are mounted to the wheel 316 at a portion 320 of the wheel 316 which projects radially outwardly beyond an adjacent portion 322 of the wheel 316. The portion 320 may be referred to as a projecting rim. The adjacent portion 322 may be described as a main rim of the wheel 316, and extends across a majority of the axial length of the wheel 316. The teeth 200 (only one of which is labelled in FIG. 22) are mounted to the adjacent portion 322 (otherwise referred to as the main rim).

The array 318 of guards 300 is provided at an inner position 324 of the wheel 316. Said inner position 324 of the wheel 316 is the end of the wheel 316 adjacent a main body of the compactor vehicle in use. The inner portion 324 may be referred to as an inner end of the wheel 316. An opposing outer (i.e. exposed) end 326 of the wheel 316 is the end which is distal the main body of the compactor vehicle in use.

As described above, the guard 300, and so array 318, protects the compactor vehicle by reducing the risk that debris, such as wire and/or strapping, become entangled around, and damage, a main shaft seal provided around an axle which the wheel 316 is mounted to.

The described and illustrated embodiments are to be considered as illustrative and not restrictive in character, it being understood that only preferred embodiments have been shown and described and that all changes and modifications that come within the scope of the inventions as defined in the claims are desired to be protected. In relation to the claims, it is intended that when words such as "a," "an," "at least one," or "at least one portion" are used to preface a feature there is no intention to limit the claim to only one such feature unless specifically stated to the contrary in the claim. When the language "at least a portion" and/or "a portion" is used the item can include a portion and/or the entire item unless specifically stated to the contrary.

Optional and/or preferred features as set out herein may be used either individually or in combination with each other where appropriate and particularly in the combinations as set out in the accompanying claims. The optional and/or preferred features for each aspect of the invention set out herein are also applicable to any other aspects of the invention, where appropriate.

What is claimed is:

1. A guard for a compactor vehicle, the guard comprising a base and a cap;
    wherein the base comprises:
        a body defining an underside, configured to engage a wheel of the compactor vehicle, and an opposing cap-facing side; and
        a first retention feature;
    wherein the cap comprises:
        an outer surface; and
        a second retention feature;
    wherein the first and second retention features interlock with one another to secure the cap to the base;
    wherein the cap extends at least partly through the base; and
    wherein a cavity is defined in the underside of the base.

2. The guard according to claim 1, wherein the cavity is bound by a peripheral edge which extends around the underside of the base.

3. The guard according to claim 1, wherein the cavity is generally cuboidal.

4. The guard according to claim 1, wherein the cavity extends through at least a majority of the base.

5. The guard according to claim 1, wherein the base further comprises one or more recesses, the one or more recesses extending between the cavity and the cap-facing side.

6. The guard according to claim 5, wherein the one or more recesses are generally trapezoidal.

7. The guard according to claim 1, wherein the base further comprises an attachment portion which projects from the cap-facing side.

8. The guard according to claim 7, wherein the attachment portion defines the first retention feature.

9. The guard according to claim 8, wherein the first retention feature comprises an aperture which extends through the attachment portion.

10. The guard according to claim 7, wherein one or more buttresses extend between the attachment portion and the cap-facing side.

11. A method of manufacturing a guard according to claim 1, the method comprising:
    casting the base using a first molten metal material;
    casting the cap onto at least the cap-facing side of the base using a second molten metal material;
    wherein the first and second retention features interlock with one another to secure the cap to the base whilst the second molten material is at least partly molten; and
    wherein the second molten metal material is substantially prevented from entering the cavity.

12. The method according to claim 11, wherein the second molten metal material is substantially prevented from entering the cavity by a blocking element.

13. The method according to claim 11, wherein the base further comprises one or more recesses, the one or more recesses extending between the cavity and the cap-facing side; and wherein the second molten metal material flows through the one or more recesses to secure the cap to the base.

14. The method according to claim 11, wherein the first retention feature comprises an aperture which extends through the attachment portion; and wherein the second molten metal material flows through the aperture of the attachment portion to secure the cap to the base.

15. A guard for a compactor vehicle, the guard comprising a base and a cap;

wherein the base comprises:

a body defining an underside, configured to engage a wheel of the compactor vehicle, and an opposing cap-facing side; and a first retention feature;

wherein the cap comprises:

an outer surface; and a second retention feature;

wherein the first and second retention features interlock with one another to secure the cap to the base;

wherein the base has an arcuate underside; and wherein a cavity is defined in the underside of the base.

\* \* \* \* \*